US010652745B2

(12) United States Patent
Beachem et al.

(10) Patent No.: US 10,652,745 B2
(45) Date of Patent: *May 12, 2020

(54) SYSTEM AND METHOD FOR FILTERING ACCESS POINTS PRESENTED TO A USER AND LOCKING ONTO AN ACCESS POINT

(71) Applicant: Apple Inc., Cupertino, CA (US)

(72) Inventors: Brent Beachem, Riverton, UT (US); Peter Boucher, Orem, UT (US); Gabe Nault, Draper, UT (US); Richard Rollins, Salt Lake City, UT (US); Jonathan Brett Wood, Layton, UT (US); Michael Wright, Sandy, UT (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,848

(22) Filed: Jan. 8, 2016

(65) Prior Publication Data
US 2016/0360414 A1 Dec. 8, 2016

Related U.S. Application Data

(63) Continuation of application No. 11/176,999, filed on Jul. 7, 2005, now Pat. No. 9,237,514, which is a (Continued)

(51) Int. Cl.
*H04W 12/08* (2009.01)
*H04W 4/029* (2018.01)
(Continued)

(52) U.S. Cl.
CPC ............ *H04W 12/08* (2013.01); *H04L 63/101* (2013.01); *H04L 63/102* (2013.01); *H04L 63/20* (2013.01);
(Continued)

(58) Field of Classification Search
CPC ........ G06F 21/10; G06F 21/556; G06F 21/62; G06F 2221/2119; G06F 21/32;
(Continued)

(56) References Cited

U.S. PATENT DOCUMENTS

| 5,237,677 A | 8/1993 | Hirosawa et al. |
| 5,335,346 A | 8/1994 | Fabbio |

(Continued)

FOREIGN PATENT DOCUMENTS

| WO | WO-02/19116 | 3/2002 |
| WO | WO-02/067173 | 8/2002 |

OTHER PUBLICATIONS

International Search Report dated Aug. 23, 2004, directed to International Application No. PCT/US2003/40546; 5 pages.
(Continued)

*Primary Examiner* — Alexander Lagor
*Assistant Examiner* — Sanchit K Sarker
(74) *Attorney, Agent, or Firm* — Kubota & Basol LLP

(57) ABSTRACT

The present invention filters access points presented to a user and locks onto an access point and includes an access point filtering unit and an access point locking unit. The access point filtering unit determines the access points that are accessible by a client device and then filters them to present only the access points that are acceptable to under a security policy in force. The access point locking unit has a plurality of operating modes and can lock onto a user selected access point, a security policy prescribed access point, or the access point with the best signal profile. The present invention also includes a method for filtering access points and a method for locking onto an access point that is selected by the user, that has the best signal profile, or that is prescribed by a security policy for a given location.

25 Claims, 11 Drawing Sheets

Related U.S. Application Data continuation-in-part of application No. 10/897,060, filed on Jul. 21, 2004, now Pat. No. 7,526,800, which is a continuation-in-part of application No. 10/413,443, filed on Apr. 11, 2003, now Pat. No. 7,353,533, which is a continuation-in-part of application No. 10/377,265, filed on Feb. 28, 2003, now Pat. No. 7,308,703.

(60) Provisional application No. 60/644,064, filed on Jan. 14, 2005.

(51) Int. Cl.
  *H04L 29/06* (2006.01)
  *H04M 7/12* (2006.01)
  *H04W 48/20* (2009.01)
  *H04W 92/10* (2009.01)
  *H04W 84/12* (2009.01)
  *H04W 76/20* (2018.01)
  *H04W 12/00* (2009.01)

(52) U.S. Cl.
  CPC ........... *H04M 7/121* (2013.01); *H04W 4/029* (2018.02); *H04W 48/20* (2013.01); *H04L 63/107* (2013.01); *H04W 12/00503* (2019.01); *H04W 76/20* (2018.02); *H04W 84/12* (2013.01); *H04W 92/10* (2013.01)

(58) Field of Classification Search
  CPC ............... G06F 21/604; H04L 63/0428; H04L 67/1097; H04L 63/102; H04L 63/20; H04L 63/101; H04L 63/107; H04W 12/08; H04W 4/029; H04W 48/20; H04W 12/00503; H04W 76/20; H04W 84/12; H04W 92/10; H04M 7/121
  USPC ............................................................ 726/1
  See application file for complete search history.

(56) References Cited

U.S. PATENT DOCUMENTS

| | | |
|---|---|---|
| 5,671,351 A | 9/1997 | Wild et al. |
| 5,724,487 A | 3/1998 | Streit |
| 5,922,073 A | 7/1999 | Shimada |
| 5,930,810 A | 7/1999 | Farros et al. |
| 5,987,611 A | 11/1999 | Freund |
| 6,088,457 A | 7/2000 | Parkinson et al. |
| 6,357,019 B1 | 3/2002 | Blaisdell et al. |
| 6,370,629 B1 | 4/2002 | Hastings et al. |
| 6,453,419 B1 | 9/2002 | Flint et al. |
| 6,484,261 B1 | 11/2002 | Wiegel |
| 6,577,274 B1 | 6/2003 | Bajikar |
| 6,580,914 B1 | 6/2003 | Smith |
| 6,609,196 B1 | 8/2003 | Dickinson, III et al. |
| 6,636,491 B1 | 10/2003 | Kari et al. |
| 6,654,608 B1 | 11/2003 | Monell et al. |
| 6,681,107 B2 | 1/2004 | Jenkins et al. |
| 6,684,330 B1 | 1/2004 | Wack et al. |
| 6,728,885 B1 | 4/2004 | Taylor et al. |
| 6,772,213 B2 | 8/2004 | Glorikian |
| 6,778,837 B2 | 8/2004 | Bade et al. |
| 6,873,988 B2 | 3/2005 | Herrmann et al. |
| 6,892,317 B1 | 5/2005 | Sampath et al. |
| 6,987,975 B1* | 1/2006 | Irvin ................... H04W 4/029 455/456.1 |
| 7,069,581 B2 | 6/2006 | Fu et al. |
| 7,075,912 B2 | 7/2006 | Suda et al. |
| 7,085,936 B1 | 8/2006 | Moran |
| 7,093,283 B1 | 8/2006 | Chen et al. |
| 7,103,542 B2 | 9/2006 | Doyle |
| 7,142,890 B2 | 11/2006 | Irimajiri et al. |
| 7,213,057 B2 | 5/2007 | Trethewey et al. |
| 7,308,703 B2 | 12/2007 | Wright et al. |
| 7,325,248 B2 | 1/2008 | Syvaenne |
| 7,353,533 B2 | 4/2008 | Wright et al. |
| 7,430,604 B2 | 9/2008 | Balogh |
| 7,478,420 B2 | 1/2009 | Wright et al. |
| 7,519,974 B2 | 4/2009 | Newport et al. |
| 7,519,984 B2 | 4/2009 | Bhogal et al. |
| 7,523,499 B2 | 4/2009 | Wilkins et al. |
| 7,526,800 B2 | 4/2009 | Wright et al. |
| 7,542,475 B2 | 6/2009 | Bar-Zakai |
| 7,636,936 B2 | 12/2009 | Wright et al. |
| 7,725,589 B2 | 5/2010 | Nicodemus et al. |
| 7,793,335 B2 | 9/2010 | Bali et al. |
| 7,796,998 B1 | 9/2010 | Zellner et al. |
| 7,802,104 B2 | 9/2010 | Dickinson et al. |
| 7,882,555 B2 | 2/2011 | Ben-Itzhak |
| 7,890,640 B2 | 2/2011 | Ribot |
| 8,020,192 B2 | 9/2011 | Wright et al. |
| 8,412,931 B2 | 4/2013 | Vedula et al. |
| 2001/0038626 A1 | 11/2001 | Dynarski et al. |
| 2001/0044849 A1 | 11/2001 | Ndili et al. |
| 2002/0042265 A1 | 4/2002 | Kumaran et al. |
| 2002/0046253 A1 | 4/2002 | Uchida et al. |
| 2002/0055817 A1 | 5/2002 | Chou |
| 2002/0059078 A1 | 5/2002 | Valdes et al. |
| 2002/0059453 A1 | 5/2002 | Eriksson et al. |
| 2002/0062310 A1* | 5/2002 | Marmor .............. G06F 16/9537 |
| 2002/0078361 A1 | 6/2002 | Giroux et al. |
| 2002/0083429 A1 | 6/2002 | Rozenfeld et al. |
| 2002/0095486 A1 | 7/2002 | Bahl |
| 2002/0095571 A1 | 7/2002 | Bradee |
| 2002/0095615 A1 | 7/2002 | Hastings et al. |
| 2002/0112046 A1 | 8/2002 | Kushwaha et al. |
| 2002/0114303 A1 | 8/2002 | Crosbie et al. |
| 2002/0152470 A1 | 10/2002 | Hammond |
| 2002/0160745 A1 | 10/2002 | Wang |
| 2002/0161905 A1 | 10/2002 | Haverinen et al. |
| 2002/0166068 A1 | 11/2002 | Kilgore |
| 2002/0184535 A1 | 12/2002 | Moaven et al. |
| 2002/0186688 A1 | 12/2002 | Inoue et al. |
| 2002/0191593 A1 | 12/2002 | O'Neill et al. |
| 2003/0013493 A1 | 1/2003 | Irimajiri et al. |
| 2003/0022673 A1 | 1/2003 | Bantz et al. |
| 2003/0053475 A1 | 3/2003 | Veeraraghavan et al. |
| 2003/0055962 A1 | 3/2003 | Freund et al. |
| 2003/0064752 A1 | 4/2003 | Adachi et al. |
| 2003/0065942 A1 | 4/2003 | Lineman et al. |
| 2003/0070067 A1 | 4/2003 | Saito |
| 2003/0074443 A1 | 4/2003 | Melaku et al. |
| 2003/0081621 A1 | 5/2003 | Godfrey et al. |
| 2003/0083965 A1* | 5/2003 | Taylor .................... G06Q 30/06 705/31 |
| 2003/0084323 A1 | 5/2003 | Gales |
| 2003/0097590 A1 | 5/2003 | Syvanne |
| 2003/0112178 A1 | 6/2003 | Bajikar |
| 2003/0133159 A1 | 7/2003 | Grosso et al. |
| 2003/0135749 A1 | 7/2003 | Gales et al. |
| 2003/0136827 A1* | 7/2003 | Kaneko ............... H04L 12/2803 235/375 |
| 2003/0159060 A1 | 8/2003 | Gales et al. |
| 2003/0159066 A1* | 8/2003 | Staw ...................... H04L 63/10 726/21 |
| 2003/0167405 A1 | 9/2003 | Freund et al. |
| 2003/0177389 A1* | 9/2003 | Albert ................. H04L 12/2856 726/1 |
| 2003/0184474 A1 | 10/2003 | Bajikar |
| 2003/0188160 A1 | 10/2003 | Sunder et al. |
| 2003/0194500 A1 | 10/2003 | Masuda et al. |
| 2003/0208530 A1 | 11/2003 | Bhogal et al. |
| 2004/0002343 A1 | 1/2004 | Brauel et al. |
| 2004/0003285 A1 | 1/2004 | Whelan et al. |
| 2004/0003289 A1 | 1/2004 | Bhogal et al. |
| 2004/0010579 A1 | 1/2004 | Freese |
| 2004/0015706 A1 | 1/2004 | Eshghi et al. |
| 2004/0018844 A1 | 1/2004 | Cheng |
| 2004/0052232 A1 | 3/2004 | Ramaswamy et al. |
| 2004/0073654 A1 | 4/2004 | Sarma |
| 2004/0105434 A1 | 6/2004 | Baw |
| 2004/0123150 A1 | 6/2004 | Wright et al. |

(56) References Cited

U.S. PATENT DOCUMENTS

| | | |
|---|---|---|
| 2004/0123153 A1 | 6/2004 | Wright et al. |
| 2004/0192339 A1 | 9/2004 | Wilson et al. |
| 2004/0198220 A1 | 10/2004 | Whelan et al. |
| 2004/0202141 A1 | 10/2004 | Sinivaara et al. |
| 2004/0203593 A1 | 10/2004 | Whelan et al. |
| 2004/0203718 A1 | 10/2004 | Knauerhase et al. |
| 2004/0203900 A1 | 10/2004 | Cedervall et al. |
| 2004/0203902 A1 | 10/2004 | Wilson et al. |
| 2004/0203903 A1 | 10/2004 | Wilson et al. |
| 2004/0215956 A1 | 10/2004 | Venkatachary et al. |
| 2005/0055578 A1 | 3/2005 | Wright et al. |
| 2005/0091355 A1 | 4/2005 | Keohane et al. |
| 2005/0125511 A1 | 6/2005 | Hunt |
| 2005/0135315 A1 | 6/2005 | Sinha |
| 2005/0188222 A1 | 8/2005 | Motsinger et al. |
| 2005/0266826 A1 | 12/2005 | Vlad |
| 2006/0037064 A1 | 2/2006 | Jeffries et al. |
| 2006/0094400 A1 | 5/2006 | Beachem et al. |
| 2006/0097590 A1 | 5/2006 | Schill |
| 2006/0120526 A1 | 6/2006 | Boucher et al. |
| 2007/0101440 A1 | 5/2007 | Bhatia et al. |
| 2008/0046965 A1 | 2/2008 | Wright et al. |
| 2008/0052395 A1 | 2/2008 | Wright et al. |
| 2008/0068654 A1 | 3/2008 | Hirashima et al. |
| 2008/0077971 A1 | 3/2008 | Wright et al. |
| 2008/0109679 A1 | 5/2008 | Wright et al. |
| 2009/0172788 A1 | 7/2009 | Vedula et al. |
| 2014/0259092 A1 | 9/2014 | Boucher et al. |
| 2016/0164913 A9 | 6/2016 | Boucher et al. |

OTHER PUBLICATIONS 802.11 Planet. (Sep. 2001) "Location/context-Sensitive Application Development Platform Revealed for 802.11 WLANs," located at <http://www.80211-planet.com/news/print.php/880761> visited on Jun. 5, 2003. (2 pages).

802.11 Planet. (Feb. 2002) "It Knows You're Out There," located at <www.80211-planet.com/news/print.php/972541> visited on Jun. 5, 2003. (2 pages).

Aboba, B. (Jun. 2002) "IEEE 802.1X Pre-Authentication," *Microsoft Corporation Submission*: 1-47.

Ark, W. et al. (1999) "A look at human interaction with pervasive computers," *IBM Systems Journal* 38(4):504-507.

Balakrishnan, H. Powerpoint Presentation: "Pervasive Location-Aware Computing," *Distinguished Lecture Series*, Nov. 29, 2011, University of Virginia Department of Computer Science; pp. 1-44.

Barton, J. "A Cooltown Demonstration at Mobicom 2000," located at <http://home.comcast.net/~johnjbarton/ubicomp/Conferences/Mobicom2000/DemoProposal.htm> visited on May 29, 2003. (3 pages).

Blunk, L. et al. (Mar. 1998) "PPP Extensible Authentication Protocol (EAP)," located at <http://www.ietf.org/rfc/rfc2284.txt> visited on Feb. 2, 2006. (15 pages).

Chakraborty, A. (May 2000) "A Distributed Architecture for Mobile, Location-Dependent Applications," pp. 1-58.

Dey, A. (Aug. 2002) "Building Context-Aware Applications," located at <www.infethz.ch/vs/events/dag2002/program/lectures/dey_1.pdf> visited on Apr. 7, 2006. (86 pages).

Gartner Research. (Sep. 2004) "Sygate Security Enterprise Personal Firewall Product," pp. 1-11.

Gilleland, M. (2009) "Levenshtein Distance, in Three Flavors," located at <http://www.merriampark.com/Id.htm> visited on Dec. 27, 2007. (14 pages).

Grimm, R. et al. "Systems Directions for Pervasive Computing," *Proceedings of the 8th IEEE Workshop on Hot Topics in Operating Systems (HotOS-VIII)*, May 2001, Elmau, Germany; pp. 147-151.

Grimm, R. et al. "Future Directions: System Support for Pervasive Applications," *Proceedings of the International Workshop on Future Directions in Distributed Computing*, Jun. 2002, Bertinoro, Italy; pp. 56-59.

Harter, A. et al. (1999) "The Anatomy of a Context-Aware Application," located at <http://citeseernj.nec.com/cache/papers/cs/10242/ftp:zSzzSzftp.uk.research.att.comzSzpubzSzdocsSzattzSztr.1999.7.pdf/harter99anatomy.pdf> visited on Jun. 5, 2003. (11 pages).

Lopez de Ipiña, D. et al. "LocALE: a Location-Aware Lifecycle Environment for Ubiquitous Computing," *Proceedings of the 15th IEEE International Conference on Information Networking (ICOIN-15)*, Jan. 31-Feb. 2, 2001, Beppu City, Japan; pp. 1-8.

Michalakis, N. (Jul. 2002) "PAC: Location Aware Access Control for Pervasive Computing Environments," located at <mit.edu> visited on Feb. 5, 2003. (2 pages).

Microsoft Corporation. (Feb. 2003) "Network Location Awareness Service Provider (NLA)," located at <http://www.msdn.Microsoft.com/library/en-us/winsock/winsock/network_location_awareness_servi> visited on Aug. 12, 2003. (1 page).

Miu, A. (Jan. 2002) "Design and Implementation of an Indoor Mobile Navigation System," pp. 1-60.

Moore, B. et al. (Feb. 2001) "Policy Core Information Model—Version 1 Specification," The Internet Society: 1-100.

Newbury Networks, Inc. (Sep. 2001) "Newbury Networks Introduces First Breakthrough Solution for Building Location and Context-Aware Applications for 802.11b Networks," located at <http://www.newburynetworks.com/newsroom/press/press.php?id=7> visited on Jun. 5, 2003. (2 pages).

Newbury Networks, Inc. (Feb. 2002) "Newbury Networks Debuts First Location-Enabled Networks Solutions for 802.11 B WLANS," located at <http://www.newburynetworks.com/newsroom/press/press.php?id=8> visited on Jun. 5, 2003. (2 pages).

Newbury Networks, Inc. (Jun. 2002) "Newbury Networks Powers Royal Sonesta Hotel's Modern Art Exhibit for Wireless Location-Enabled Guided Tours," located at <http://www.newburynetworks.com/newsroom/press/press.php?id=9> visited on Jun. 5, 2003. (2 pages).

Pinestream Communications, Inc. (Oct. 2001) "Radar Scope," *Mobile Internet Times* 4(10): 1-2.

Priyantha, N. et al. "The Cricket Location-Support System," *6th ACM International Conference on Mobile Computing and Networking (ACM MOBICOM)* 2001, Boston, Massachusetts; pp. 32-43.

Priyantha, N. et al. "The Cricket Compass for Context-Aware Mobil Applications," *7th ACM Conference Mobile Computing and Networking (MOBICOM)* Jul. 2001, Rome, Italy; pp. 1-14.

Priyantha, N. et al. Powerpoint Presentation: "The Cricket Compass for Context-Aware Mobile Applications," *6th ACM Conference Mobile Computing and Networking (MOBICOM)* Jul. 2001, Rome, Italy; 34 pages.

Stallings, W. (2000). "Web Security," Chapter 7 *In Network Security Essentials: Applications and Standards*. Marcia Horton ed., Prentice-Hall, Inc: pp. 204-223.

Ward, A. et al. (Oct. 1997) "A New Location Technique for the Active Office," located at <http://www.lce-eng.cam.ac.uk/publications/files/tr.97.10.ps. Z> visited on Dec. 4, 2003. (13 pages).

Ziola, B. (Mar. 2002) "Label Based Access Control vs. Fine-Grained Access Control for Implementing a Virtual Private Database," Managed Ventures LLLC Publication: pp. 1-6.

Wright et al., U.S. Office Action dated Feb. 17, 2006, directed to U.S. Appl. No. 10/377,265; 11 pages.

Wright et al., U.S. Office Action dated Mar. 13, 2007, directed to U.S. Appl. No. 10/377,265; 22 pages.

Wright et al., U.S. Office Action dated Sep. 29, 2006, directed to U.S. Appl. No. 10/377,265; 13 pages.

Boucher et al., U.S. Office Action dated Mar. 28, 2016, directed to U.S. Appl. No. 14/175,640; 25 pages.

Wright et al., U.S. Office Action dated Dec. 22, 2008, directed to U.S. Appl. No. 11/926,314; 8 pages.

Wright et al., U.S. Office Action dated Jun. 9, 2009, directed to U.S. Appl. No. 11/926,314; 10 pages.

Wright et al., U.S. Office Action dated Dec. 3, 2009, directed to U.S. Appl. No. 11/926,371; 7 pages.

Wright et al., U.S. Office Action dated Jun. 10, 2010, directed to U.S. Appl. No. 11/926,371; 18 pages.

Wright et al., U.S. Office Action dated Dec. 8, 2010, directed to U.S. Appl. No. 11/926,371; 18 pages.

(56) References Cited

OTHER PUBLICATIONS

Wright et al., U.S. Office Action dated Jul. 6, 2011, directed to U.S. Appl. No. 11/926,371; 22 pages.
Wright et al., U.S. Office Action dated Feb. 2, 2012, directed to U.S. Appl. No. 11/926,371; 19 pages.
Wright et al., U.S. Office Action dated Aug. 16, 2012, directed to U.S. Appl. No. 11/926,371; 22 pages.
Wright et al., U.S. Office Action dated Apr. 8, 2008, directed to U.S. Appl. No. 11/926,436; 8 pages.
Wright et al., U.S. Office Action dated Jan. 10, 2011, directed to U.S. Appl. No. 11/926,454; 9 pages.
Wright et al., U.S. Office Action dated Oct. 4, 2006, directed to U.S. Appl. No. 10/413,443; 19 pages.
Wright et al., U.S. Office Action dated Jul. 6, 2007, directed to U.S. Appl. No. 10/413,443; 36 pages.
Wright et al., U.S. Office Action dated Dec. 19, 2007, directed to U.S. Appl. No. 10/897,060; 17 pages.
Wright et al., U.S. Office Action dated Jun. 2, 2008, directed to U.S. Appl. No. 10/897,060; 15 pages.
Beachem et al., U.S. Office Action dated Apr. 8, 2008, directed to U.S. Appl. No. 11/176,999; 12 pages.
Beachem et al., U.S. Office Action dated Feb. 18, 2009, directed to U.S. Appl. No. 11/176,999; 12 pages.
Beachem et al., U.S. Office Action dated Nov. 10, 2009, directed to U.S. Appl. No. 11/176,999; 11 pages.
Beachem et al., U.S. Office Action dated May 14, 2010, directed to U.S. Appl. No. 11/176,999; 13 pages.
Beachem et al., U.S. Office Action dated Oct. 7, 2013, directed to U.S. Appl. No. 11/176,999; 15 pages.
Beachem et al., U.S. Office Action dated Jun. 11, 2014, directed to U.S. Appl. No. 11/176,999; 22 pages.
Beachem et al., U.S. Office Action dated Feb. 24, 2015, directed to U.S. Appl. No. 11/176,999; 27 pages.
Boucher et al., U.S. Office Action dated Jun. 18, 2009, directed to U.S. Appl. No. 11/330,530; 21 pages.
Boucher et al., U.S. Office Action dated Nov. 18, 2009, directed to U.S. Appl. No. 11/330,530; 21 pages.
Boucher et al., U.S. Office Action dated Jun. 10, 2010, directed to U.S. Appl. No. 11/330,530; 23 pages.
Boucher et al., U.S. Office Action dated Sep. 19, 2011, directed to U.S. Appl. No. 11/330,530; 22 pages.
Vedula et al., U.S. Office Action dated Dec. 27, 2010, directed to U.S. Appl. No. 11/964,933; 15 pages.
Vedula et al., U.S. Office Action dated May 31, 2011, directed to U.S. Appl. No. 11/964,933; 21 pages.
Advisory Action received for U.S. Appl. No. 10/377,265, dated Dec. 8, 2006, 3 pages.
Advisory Action received for U.S. Appl. No. 11/964,933, dated Aug. 22, 2011, 2 pages.
Final Office Action received for U.S. Appl. No. 11/330,530, dated May 10, 2011, 20 pages.
Letter Restarting Period for Response received for U.S. Appl. No. 10/897,060, dated Sep. 17, 2008, 15 pages.
Letter Restarting Period for Response received for U.S. Appl. No. 11/176,999, dated Jul. 7, 2008, 12 pages.
Non-Final Office Action received for U.S. Appl. No. 11/330,530, dated Dec. 7, 2010, 17 pages.
Notice of Allowance received for U.S. Appl. No. 10/377,265, dated Jul. 30, 2007, 10 pages.
Notice of Allowance received for U.S. Appl. No. 10/413,443, dated Jan. 22, 2008, 9 pages.
Notice of Allowance received for U.S. Appl. No. 10/897,060, dated Mar. 5, 2009, 6 pages.
Notice of Allowance received for U.S. Appl. No. 11/176,999, dated Sep. 4, 2015, 9 pages.
Notice of Allowance received for U.S. Appl. No. 11/330,530, dated Aug. 17, 2015, 8 pages.
Notice of Allowance received for U.S. Appl. No. 11/926,314, dated Oct. 13, 2009, 9 pages.
Notice of Allowance received for U.S. Appl. No. 11/926,436, dated Aug. 1, 2008, 9 pages.
Notice of Allowance received for U.S. Appl. No. 11/926,454, dated May 9, 2011, 9 pages.
Notice of Allowance received for U.S. Appl. No. 11/964,933, dated Dec. 13, 2012, 7 pages.
Restriction Requirement received for U.S. Appl. No. 10/377,265, dated Oct. 24, 2005, 6 pages.
Restriction Requirement received for U.S. Appl. No. 10/897,060, dated Sep. 19, 2007, 6 pages.

\* cited by examiner

SYSTEM AND METHOD FOR FILTERING ACCESS POINTS PRESENTED TO A USER AND LOCKING ONTO AN ACCESS POINT

CROSS-REFERENCE TO RELATED APPLICATIONS

This application is a continuation of U.S. patent application Ser. No. 11/176,999, filed Jul. 7, 2005, which claims the benefit of U.S. Provisional Patent Application No. 60/644,064, filed Jan. 14, 2005, and which is a continuation-in-part of U.S. patent application Ser. No. 10/897,060, filed Jul. 21, 2004, now U.S. Pat. No. 7,526,800; U.S. patent application Ser. No. 10/413,443, filed Apr. 11, 2003, now U.S. Pat. No. 7,353,533; and U.S. patent application Ser. No. 10/377,265, filed Feb. 28, 2003, now U.S. Pat. No. 7,308,703. All of the above applications are incorporated by reference herein in their entirety.

BACKGROUND OF THE INVENTION

1. Field of Invention

This application relates to the field of wireless communication between computing devices. More particularly, the present invention relates to systems and method for determining which access points are presented to the user or set as default for communication and locking onto a particular access point for communication.

2. Description of Related Art

The availability of wired and wireless network access points (NAP) allows mobile devices like laptop computers and personal digital assistants (PDAs) to enable users to be more mobile, providing access to corporate networks, e-mail, home networks and the Internet from anywhere. With the advent of the IEEE 802.11 standard for wireless communication, and other popular wireless technologies, software products that protect against unwanted access to information stored on mobile devices and corporate servers is highly desirable.

Traditional security architectures assume that the information assets being protected are 'tethered'—wired to a particular network infrastructure such as a company's network infrastructure. But mobile users can pick up valuable corporate information, such as by copying files from a server to a laptop, and walk away from the corporate network, and connect to other networks with different security policies. Users with laptops and mobile devices want to take advantage of wireless technologies, to connect wherever they are—at work, at home, in the conference room of another company, at the airport, a hotel, a highway or at the coffee shop on the corner. The mobile device's network environment is constantly changing as the user moves about. Each environment has different needs in terms of security. Each environment presents different challenges to protect the information on the mobile device while allowing access to email, the Internet, and company Virtual Private Networks (VPNs).

Personal firewalls are designed to deal with static environments. A personal firewall could be ideally suited for mobile users if users knew how to adapt their configuration for their particular mobile application. Unfortunately, security settings for one situation can compromise data security in another. The configuration of popular personal firewalls typically requires a level of expertise on how the technology actually works that average users do not possess. Additionally, personal firewalls don't protect against all 802.11 intrusions. For example, when a user configures a personal firewall off to surf the Internet through their wireless device, their files may be vulnerable to unauthorized malicious wireless attacks on their computer.

Solutions that secure data in transit, for example a (VPN) connection, from a corporate server to a mobile client device do not protect the data once it is stored on the mobile device. For example, an executive could be retrieving sensitive files or emails from the corporate network, and the VPN will stop eavesdroppers from seeing the data in transit, but once the data is stored on the executive's mobile device, hackers in the parking lot could break into the mobile device and copy or maliciously alter the data. With the onset of new powerful mobile devices that can store corporate data, IT managers see their network perimeters having to extend to the new limits of these mobile wireless connections.

Another problem for mobile users is selecting and remaining connected to an access point when multiple access points are accessible within a dynamically changing environment. In a multiple access point environment, the prior art dynamically determines the access point with the strongest signal and switches to that access point. However, this is problematic because changes in the user's environment that cause reflections or disturbances of the wireless signals cause the wireless adapter to switch to another access point. Such switching to another available access point causes a temporary loss of connection, and re-initialization of the connection and other security protocols such as VPNs.

Thus, there is a need for a system that can control which access point is used and the condition under which the access point is switched.

SUMMARY OF INVENTION

The present invention provides one or more embodiments of systems and methods for filtering access points presented to a user and locking onto an access point. The present invention includes a computing device that has a location detection module, a policy setting module, a security policy enforcement module, an access point filtering unit, and an access point locking unit cooperatively coupled to a bus. The access point filtering unit determines the access points that are accessible by a client device and then filters them to present only the access points that are acceptable under a security policy in force. The access point locking unit has a plurality of operating modes and can lock onto a user selected access point, a security policy prescribed access point, or the access point with the best signal profile. The signal profile refers to a combination of: the protocol used for communication, the type of encryption use, the key length for encryption, the wireless signal strength, authentication method, and other factors.

The present invention also includes several methods such as: a method for filtering access points for presentation to the user, a method for locking onto an access point selected by the user, a method for locking onto an access point with the best signal profile, and a method for locking onto an access point prescribed by a security policy for a given location.

DETAILED DESCRIPTION OF THE PREFERRED EMBODIMENTS

Figure 1:
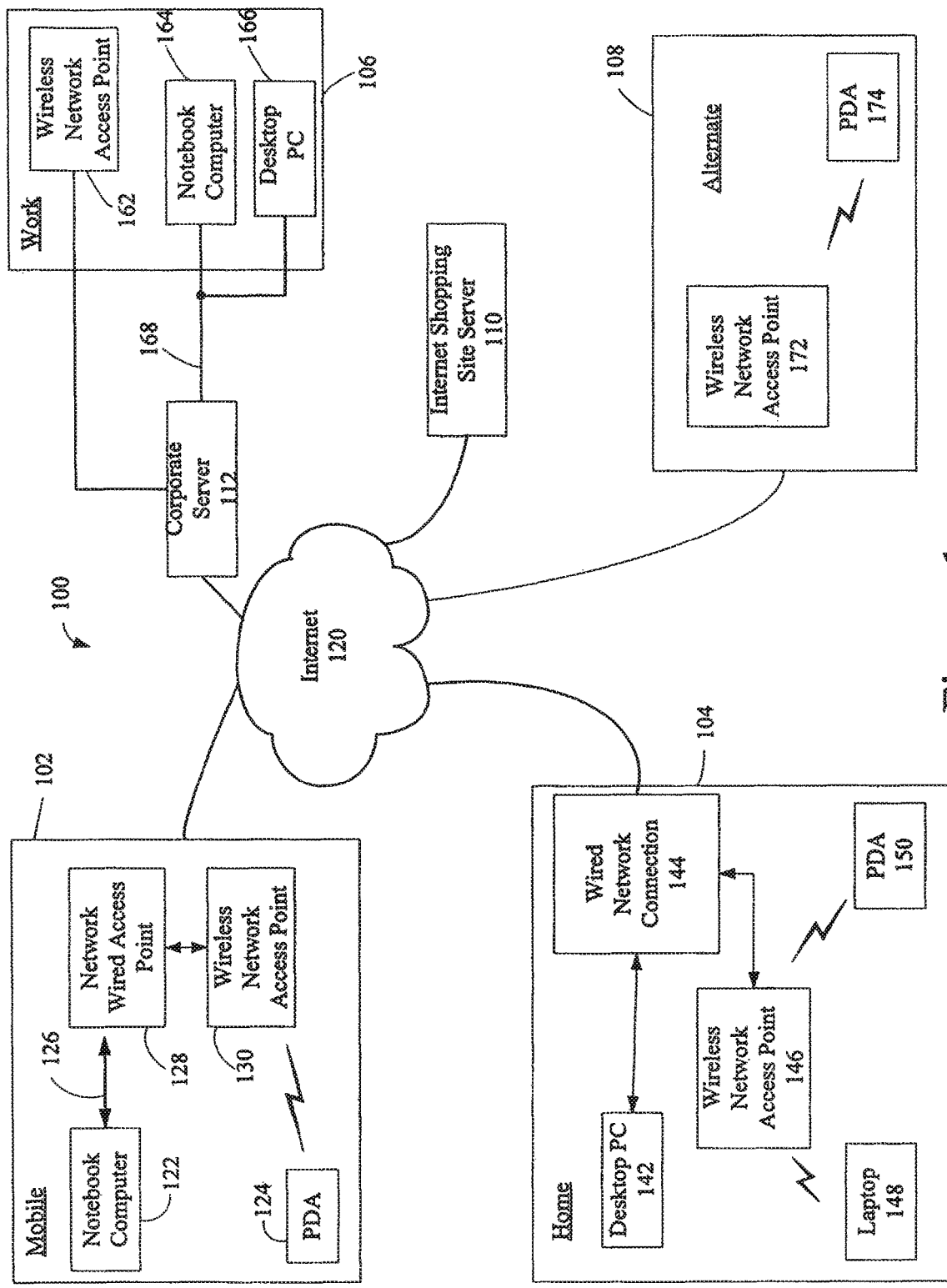
FIG. 1 illustrates one or more examples of location categories that may be assigned to a mobile device in accordance with an embodiment of the present invention.

FIG. 1 illustrates examples of location categories 102, 104, 106, 108 that may be assigned based on the network environment in which a mobile device is operating in accordance with an embodiment of the present invention. One example of a location category is "Home" 104. The network environment in which each of the mobile devices 148, 150 communicates via a network connection at a user's home is detected. Upon detection of this home network environment, each of the mobile devices 148, 150 is assigned a location indicator or type of "Home" 104. In the illustrated example, the laptop 148 and the PDA 150 communicating with the illustrated wireless network access point will have its location set to "Home."

The location "Work" 106 is an example of a location associated with a network environment maintained by a user's employer. In the illustrated example, a notebook computer 164 has a wired Ethernet connection 168 to the corporate server 112 of his or her employer. However, the notebook computer 164 may also communicate with the server 112 through a wireless NAP 162 as illustrated.

Another example of a location category is "Mobile" 102. For example, at an airport, a mobile device such as the illustrated notebook computer 122 accesses a network environment respectively through a wired connection 126 (in this example a T1 line) to a wired network access point 128. This wired network access point 128 may provide access to an Internet shopping site server 110 because the user desires to browse the site while waiting for departure. The notebook computer 122 and the personal digital assistant (PDA) 124 alternatively have a wireless connection to a wireless NAP 130, in this example an 802.11b connection through which they may communicate at the airport. Additionally, as discussed below, the security policy associated with the "Mobile" location may take into account the connection type of wired or wireless. In this example, the network environment provided at the airport does not match with a defined environment associated with a location such as "Work" 106 or "Home" 104 so "Mobile" 102 is assigned or associated with the PDA 124 and the notebook computer 122 as a default location.

The last location example is "Alternate" 108. In one example, a specific environment (e.g. an environment associated with a university computer lab or an environment associated with a type of network class) may be associated with "Alternate." Similarly, a "Custom" or another named location may also be defined. In this example, the wireless network access point 172 is associated with a cellular base station providing network access through a General Packet Radio Services (GPRS) system, Global System for Mobile communication (GSM) system, third generation wireless 3G system or other kind of mobile wireless communication system. A PDA 174 communicates wirelessly to the NAP 172 for access to the network 120.

System Overview

Figure 2A:
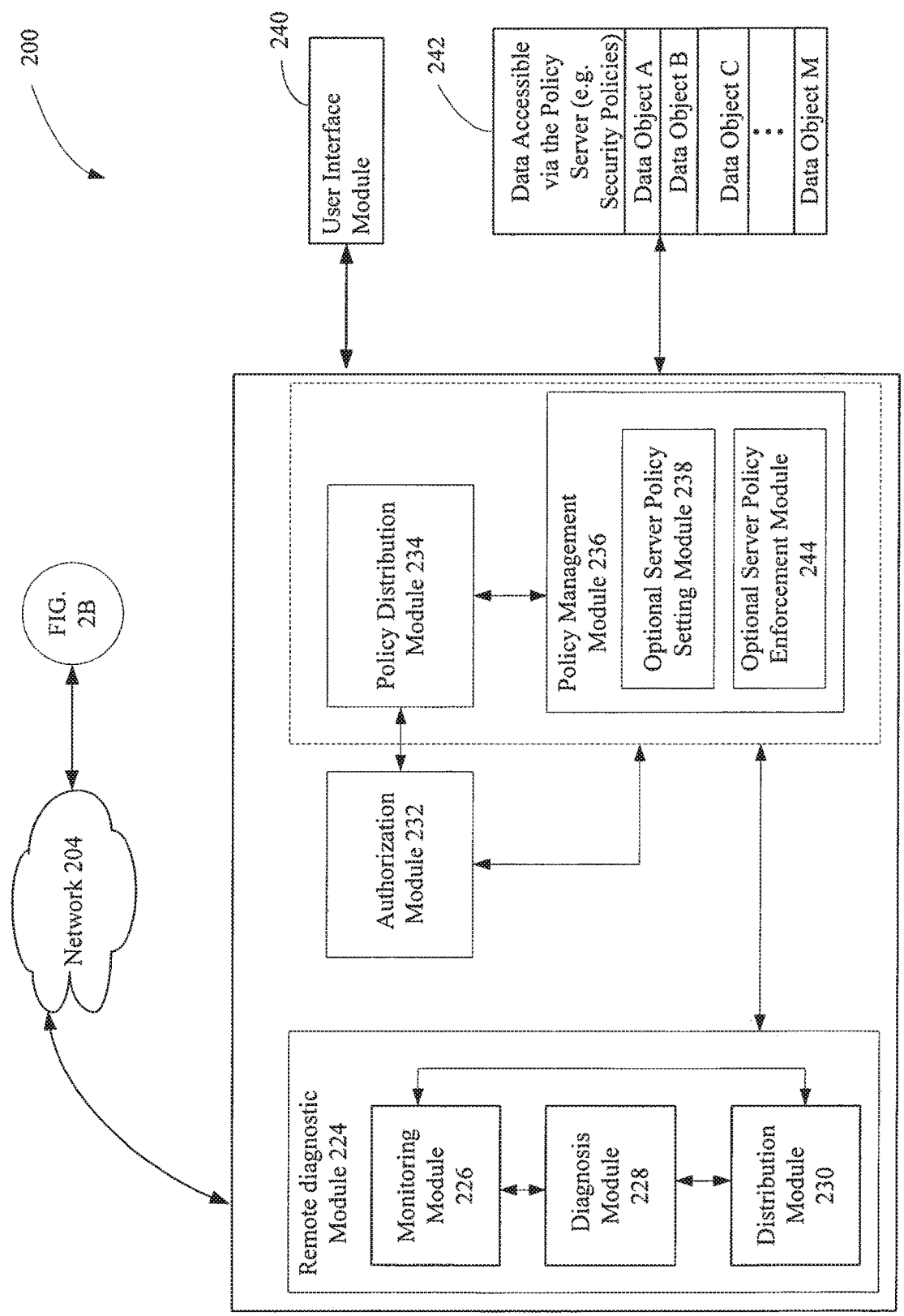
FIG. 2A illustrates a server or system for protecting of data accessible by one or more mobile devices based on a location associated with the mobile device and source information for the data requested in accordance with a first embodiment of the present invention.
Figure 2B:
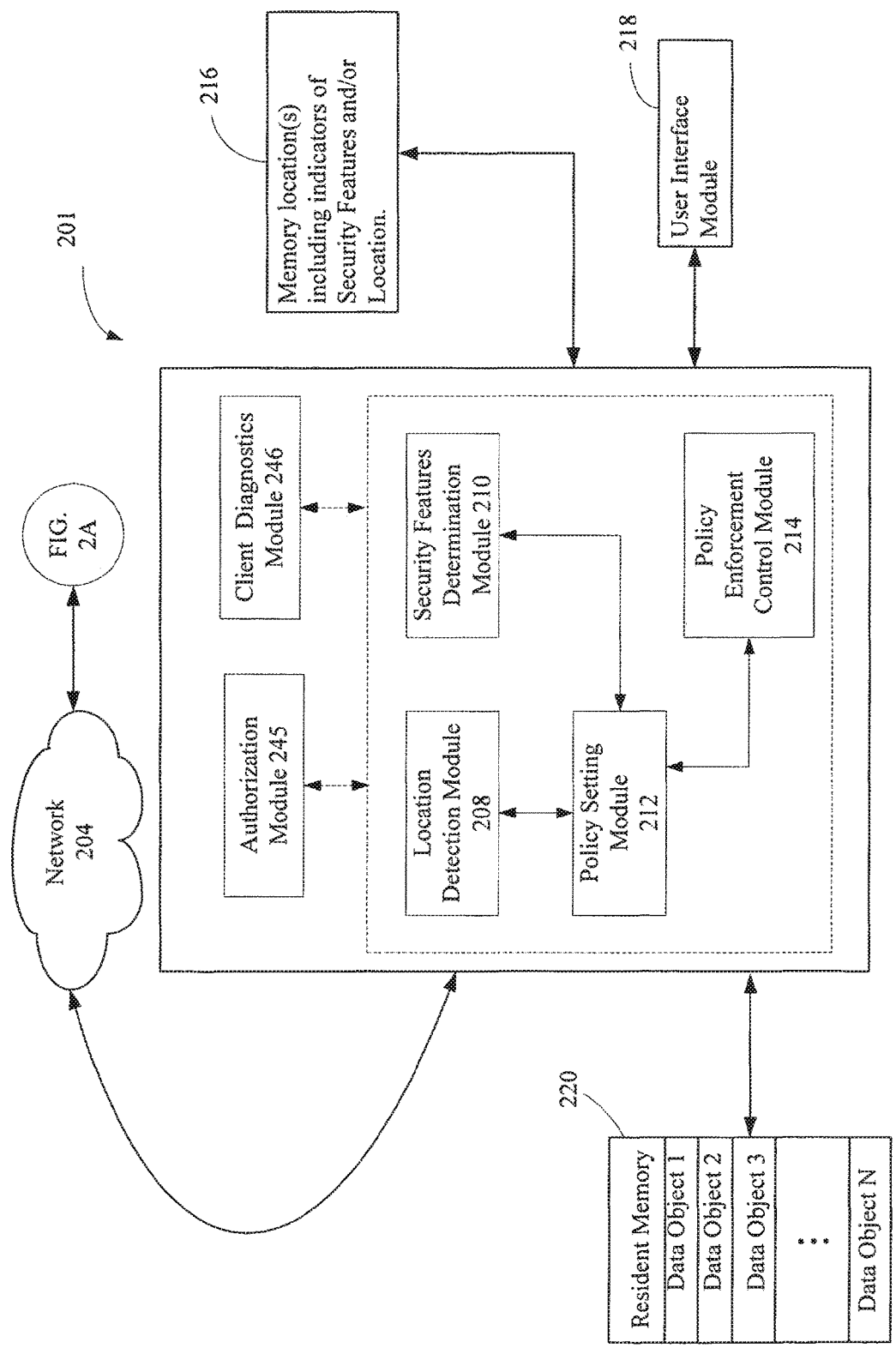
FIG. 2B illustrates a system in a mobile client device for protecting data accessible by the mobile device based on a location associated with the mobile device and source information for the data requested in accordance with the first embodiment of the present invention.

FIGS. 2A and 2B illustrate interaction between a computer system 200 (FIG. 2A) acting in a server role with respect to a mobile computer system 201 (FIG. 2B) acting in a client role for the purposes of managing security in accordance with an embodiment of the invention. Similarly, FIGS. 2A and 2B also illustrate interaction between the server computer system 200 and the mobile client computer system 201 for the purpose of providing diagnostic assistance to the client computer system. The system 200 in FIG. 2A may be implemented as software executing in a stand-alone computer having a processor being accessible to memory, the processor being communicatively coupled with one or more network interfaces, a display and input/output devices such as a keyboard and a pointing device. Similarly, the system 200 may be implemented by a series of networked computers as may typically be implemented by an enterprise. Additionally, the system 200 of FIG. 2A may be implemented on another mobile computing device 201. The server or server-side system 200 allows an administrator to manage and distribute policies and software upgrades, analyze logs, and perform remote diagnostics. The client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 monitors the user's changes in location and/or security features and applies the appropriate policies automatically as the user moves about or different security features are activated or deactivated. The client 201 enforces the policies set up by the administrator, and performs diagnostics. The client 201 can also create and manage policies for the client mobile device when run in a self-managed mode. The server system 200 is discussed first.

Server System

FIG. 2A illustrates a system 200 for administering protection of data accessible by a mobile device based on a location associated with a network environment in which the mobile device is operating and the access point in use. The illustrated system embodiment 200 comprises an authorization module 232, a policy distribution module 234, a policy management module 236, illustrated here with an optional policy setting module 238 and an optional policy enforcement module 244, a remote diagnostics module 224 and a user interface module 240. The system 200 protects data accessible by the mobile device that may be resident (See FIG. 2B, 220) or data 242 that is accessible by the mobile device over a network 204. Examples of such data may include security policies, corporate data, group files indicating the organization of personnel into various groups, client device management data, and diagnostic information related to the mobile devices or computers internal to the corporate network. As is apparent, these are examples of information valuable to a company. As illustrated, each of these modules has a communication interface or is communicatively coupled to each of the other modules and has access to data objects 242 stored in memory of the server 200 and also has access to a network 204 (e.g. Internet).

The policy management module 236 manages security policies. One aspect of managing security policies is defining the policies. In this example, the policy management module 236 comprises instructions for establishing this pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. There may be a base policy applicable to a group of entities. Examples of entities may be users or the mobile devices themselves. In these examples, the group may include one instance of an entity. The attributes of the base policy may be incorporated into other policies that add on additional attributes. For example, a base policy for the group including engineers in the user interface design department may be allowed access to files on a certain disk drive. Another policy based on location that incorporates the attributes of the base policy may only allow access to encrypted versions of the files if a mobile device through which a UI design engineer is logged in is operating in a "Home" network location. The optional policy setting module 238 is discussed below in the discussion of the client policy setting module 212 of FIG. 2B. The optional policy enforcement module 244 is discussed below in the discussion of the client policy enforcement control module 214 of FIG. 2B.

In one embodiment, the policy management module 236 is provided with an enterprise's existing group structures. The policy management module 236 compensates for a failing in the traditional makeup of groups. Since groups are not hierarchical, it is common for one person to be a member of several groups, and if each group has its own security policy, an issue arises as to how to determine which policy to apply to a particular user. The policy management module 236 inputs a prioritized list of groups from a memory location 242. The policy management module 236 searches the groups in priority order of the list. Thus, if a person is a member of "engineering" and "executive staff," that person will get the security policy for whichever of those two groups comes first in the prioritized list. There is a default policy for users who are not members of any of the groups on the prioritized list. Further, there is a highest priority group that always has the highest priority. An example of such a group is a "stolen mobile device" group that always has the highest priority, because it doesn't matter what other groups the device is associated with if the device is in the hands of a thief.

The policy distribution module 234 distributes security information to the one or more client mobile devices. The policy distribution module 234 has a communication interface or is communicatively coupled to the policy management module 236 for receiving notifications of updated security information. Examples of security information are versions of existing policies, policies, or software. An example of communication interface is a bus between a processor executing one or more of the modules and a memory controller responsible for memory reads/writes. Another example is one module reading a parameter stored in a memory location by another module. Of course, other communication interfaces known to those of ordinary skill in the art may also be used.

In this embodiment, the authorization module 232 authorizes a communication exchange between the client mobile device and the policy distribution or policy management modules. The authorization module 232 is a further safeguard against unauthorized or rogue mobile devices trying to hijack the security policies or corporate data. Various authorization protocols and techniques may be used. One example is a simple username and password verification scheme. Another example of a type of authorization protocol is a cryptographic authentication protocol. The authorization module 232 may also be used to authorize a communication exchange between the client system 201 and the remote diagnostics module 224.

The remote diagnostics module 224 is illustrated in the context of a server 200 in FIG. 2A concerned with security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. The remote diagnostics module 224 has a communication interface or is communicatively coupled with the user interface module 240, the authorization module 232, the policy management module 236 and the policy distribution module 234. This allows a person using the mobile device to get the device repaired where they are as opposed to having to mail the device or wait until he or she is back in the office to get help.

The remote diagnostics module 224 comprises three modules or sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2B, 246) periodically and automatically initiates tests. Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2B). This information may be received periodically over a network 204 from the client diagnostics module 246, or upon an initial network connection by the mobile device with the server, or because the client diagnostics module 246 requests diagnostic assistance.

The diagnosis module 228 analyzes diagnostic information stored for the mobile device. For example the diagnosis module 228 may perform analysis according to pre-stored diagnostic programs or according to an interactive user environment or a combination of the two. The diagnosis module 228 may provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g. FIG. 2B, 218). Once a diagnosis has been made with respect to a problem, support information may be distributed to the mobile device under the control of the diagnosis distribution module 230. For example, support information may be in the form of instructions or code to the client device to repair a problem or perform maintenance. This provides an advantage of taking corrective or preventive actions without requiring user intervention or action. Another example of support information that may be forwarded is messages for display by the client device providing a diagnostic report or requesting specific input from a user of the device.

Either the monitoring module 226 or the diagnosis module 228 may initiate tests and/or queries to determine the readiness or robustness of the existing client device population. Trends may be noted. Again, these tests may be run during a connection with a device without requiring user intervention.

The remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

In the system embodiment of FIG. 2A, the policy management module 236 defines a security policy applicable to a client mobile device based upon criteria. One example of criteria is the location associated with the network environment in which the mobile device is operating and source information. Other examples of criteria are the presence or the activity status of one or more security features. Of course, a combination of location and one or more security features may also form a criteria basis for defining a security policy. The policy management module 236 designates one or more client devices associated with the policy. In one example, this association may be based on an entity or class to which the security policy is applicable. An example of an entity is a group with one or more members. An example of a member may be a user of the client mobile device. A policy may be set that is applicable to the group of all engineers in the software development department. Another example of a member is the mobile device itself. For example, the capabilities of different mobile devices may be the basis for classifying them into different groups. In a secure manner, the policy management module 236 provides the one or more designated client mobile devices with authorization information for use in contacting the server system securely. One example of authorization information is an encrypted token provided by the authorization module to the mobile client device during a trusted connection between the two. An example of a trusted connection may be an internal connection behind the firewall of and within the internal network of the enterprise with which both the server system and the mobile client device system are associated. In one embodiment, a management server within the firewall in the internal network provides the authorization information. When a client mobile device connects via the Internet, it interacts with one or more of the enterprise side servers external to the firewall. The client contacts the external servers to retrieve policies and instructions. The external servers also perform key/identity management and policy persistence. The external servers communicate with the management server through the firewall for client management information such as a key, a user, a group, and version information associated with a client mobile device system. In a similar manner, responsive to security information such as a policy or software being designated for encryption, the policy management module 236 provides the designated client mobile device with cryptographic information that the client device can store and use to decrypt the security information. An example of cryptographic information is a key for use with a cryptographic authentication protocol. In one example, Microsoft® web keys may be used. The policy management module 236 sets the permissions for the one or more associated mobile devices with respect to the one or more policies. In one aspect, permissions typically relate to the allowable modification that may be made to a downloaded policy or client software by the client mobile device. Permissions may be applied to various policies and to the criteria upon which policies are defined. For example, there may be permissions set for a policy, but permissions may also be set with respect to a location. Some examples of permissions specific to policies are as follows:

Ability to see the tray icon
Ability to shut down the service
Ability to go to unmanaged mode
Ability to go to self-managed mode
Ability to change to a different policy server, or get a policy from another server in the same enterprise
Ability to not pull down new policies when they are available
Ability to get software updates directly from a vendor
Ability to launch the settings application
Ability to modify visual settings
Ability to modify feedback levels
Ability to see/modify server-defined global objects (for each type of object)
Ability to create new global objects (for each type of object)
Ability to see/modify global objects in the policy (for each type of object)
Ability to change the global objects used in the policy (for each type of object)
Ability to remove adapters from the policy.

Some examples of permissions specific to locations are as follows:

Ability to manually switch to a location
Ability to override a location.
Ability to manually switch to a different location
Ability to change enforcement mechanisms.

In one embodiment, in setting the permissions, for flexibility, a permission setting or a level of identification for each of the permissions may also be set. Some examples of these possible settings or levels are as follows:

Modifiable: The user has permission to modify the setting freely.

Recommended: The user has permission to modify the setting, but the application will recommend the policy's default.

Mandatory: The user does not have permission to modify the setting.

Hidden: The user does not have permission to view or modify the setting.

The policy management module 236 determines whether the security information is to be encrypted. If not, the policy management module 236 stores the security policy. If it is to be encrypted, the policy is encrypted. Similarly the policy management module 236 may also encrypted other types of security information such as software updates before they are stored. For example, the security policy may be stored as a data object in a memory 242 accessible via an internal enterprise network. In another example, security policies may be included in XML documents that may themselves be encrypted. In an alternate embodiment, the policy management module 236 may store the policy unencrypted, the policy distribution module 234 makes the determination of whether encryption applies to the policy or other security information, and the policy distribution module 234 encrypts the security information before distributing it. Additionally, in the embodiment of FIG. 2A, the policy management module 236 manages the one or more client devices for security purposes. One aspect of client management is that the policy management module 236 maintains client management information for the mobile device and the one or more policies associated with it. The following list of information fields is an example of the types of information that may be included in client management information.

User Name
Group
Connection state, which is one of:
    Connected
    Last connected time
    Never connected
Policy for this user
Policy version for this user
Software version for this user
Current enforcement mechanisms
Diagnostic level, including diagnostic options available in the client settings
Diagnostic information
Auditing level
Auditing information
Locations Previously Detected The information may be organized in a data object stored in a memory 242 accessible to the server computer system.

Through a user interface, a system administrator provides input indicating actions to be taken with respect to managing clients. In the embodiment of FIG. 2A, the user interface module 240 provides the input to the policy management module 236. In one example, a graphical user interface (GUI) for managing mobile client devices provides a list of information identifying directly or indirectly all mobile client devices that have connected to the server system, and has controls for managing them. Information displayed may be based on information sent during client-server negotiation. Below are some examples of actions to be taken for one or more client devices selected in accordance with user input.

Remove this client device from the current list of connected client devices (although the client device is re-added the next time he connects).

Change auditing level (to one of the options described below).

Change the diagnostic level.

View the diagnostic or event log for this client device.

Reassign this client device to another group.

Define Properties (e.g. required hardware, required software, data accessibility rights, data visibility rights.)

Mobile Device/Client System

FIG. 2B illustrates a system 201 for protecting data accessible by a mobile device based on a location associated with a network environment in which the mobile device is operating and an access point being used. Additionally, the system 201 in FIG. 2B illustrates a system for determining and enforcing security policies based upon the activity status of a security feature in a communication session between the mobile device and another computer. The system 201 comprises a location detection module 208, a policy setting module 212, security features determination module 210, a policy enforcement control module 214, a user interface module 218, memory location(s) 216, an authorization module 245, and a client diagnostics module 246. The system 201 protects data accessible by the mobile device 201 that may be in resident memory 220 on the device or data 242 accessible over a network 204. In this illustrated example, each of these modules has a communication interface or is communicatively coupled to each of the other modules. One or more of these modules may access resident memory 220.

The authorization module 245 provides authorization information to the authorization module 232 of the server 200 to establish communication exchanges with the client mobile device 201 for the exchange of security information or diagnostic information or both. The client diagnostics module 246 collects diagnostic information that is sent to the remote diagnostics module 224 of the server system embodiment 200.

In one embodiment, the location detection module 208 receives network parameters from network 204 and detects or determines the location associated with the current network environment based upon criteria defined in a downloaded policy from the server system 200. In this example, the policy setting module 212 receives, installs and updates the security information including security policies and/or software updates received from the policy management module 236 via the policy distribution module 234 over the network connection 204. The policy setting module 212 may define criteria or if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218.

In this embodiment, memory locations 216, including indicators of security features and/or location indicators, have a communication interface (e.g. a bus between a processor executing one or more of the modules and a memory controller responsible for memory reads/writes) to the location detection module 208, the security features determination module 210, the policy setting module 212, the policy enforcement control module 214, the authorization module 245, and the client diagnostics module 246. The location detection module 208 has a communication interface to the policy setting module 212. In the embodiment, the policy setting module 212 determines a security policy based upon the location detected by the location detection module 208 and communicated via a communication interface. In one example of the communication interface, the policy setting module 212 may read a current location indicator 216 updated in a memory location 216 by the location detection module 208. The policy setting module 212 may then read the location indicator 216 periodically or responsive to a notification message from the location detection module 208. In another example, the location detection module 208 may pass the currently detected location to the policy setting module 212 as a parameter in a message. Of course, other communication interfaces known to those of ordinary skill in the art for use in notifying the policy setting module 212 of the current location may also be used.

In an alternate embodiment, an optional policy setting module 238 may operate on a server computer system such as the one illustrated in FIG. 2A that determines the selection of the current security policy for the mobile device based on criteria information received from the mobile device 201 including location and activity status of one or more security features or based on network parameters received from network 204. In this embodiment, a module on the client device such as the policy enforcement control module 214 receives commands from the policy setting module 238 and executes them on the mobile device.

The policy setting module 212 also has a communication interface to a policy enforcement module 214. The policy enforcement module 214 comprises instructions for enforcing the security policy currently set by the policy setting module 212. The enforcement module 214 comprises instructions for one or more enforcement mechanisms associated with a security policy. Again, in an alternate embodiment, an optional policy enforcement module 244 in a server computer system 200 with which the client device has a network connection 204 may send instructions to the mobile device for the enforcement of a security policy as determined by the optional policy setting module 238 for the local device on the server side.

Furthermore, the policy enforcement control module 214 may include an access point filtering unit, and an access point locking unit cooperatively coupled to the other components noted above. The access point filtering unit determines the access points that are accessible by the client device, filters the access points using the security policy in force and presents only access points authorized for use to a user for selection. The access point locking unit locks communication between the access point and the mobile client device so that the mobile client device will not jump to connect with other access points having stronger signal strength. For the present invention the term "lock" or "locking" means only that the connection to the same access point is maintained. The connection is not switched and others are prevented from connecting to the mobile computing device 201. Locking is not meant to imply any type of required coding or encryption. The access point locking unit has a plurality of operating modes and can lock onto a user selected access point, a security policy prescribed access point, or the access point with the best signal profile. The signal profile refers to a combination of: the protocol used for communication, the type of encryption used, the key length for encryption, the wireless signal strength, authentication method and other factors. The operation of these units is explained further below with reference to the flowcharts of FIGS. 5-8 and the example in FIGS. 9A and 9B.

In this embodiment, a user interface module 218 has a communication interface to one or more of these modules 208, 210, 212, 214, 245, and 246. In one embodiment, the user interface module 218 receives input from a user input device such as a keyboard, mouse, or touchpad, and causes user interfaces to be displayed for use by a user for establishing criteria for defining an aspect of a security policy as allowed by permissions associated with the policy or when operating in a standalone mode not under the control of the server system 200.

The system 201 further comprises a security feature module 210 for determining whether one or more security features have an activity status of inactive or active in a communication session between the mobile device and another computer. An example of a security feature is a connection type of wired or wireless. In one example, this connection type may be indicated by the association of the port over which data is communicated with a wireless or wired network adapter or network interface card (NIC). In another example, this connection type may be indicated by the association of a local IP address with data communicated over a wireless or wired network adapter or network interface card (NIC). In other embodiments, policies may be set based on particular features besides simply connection type. For example, a different security policy may be applied for different brands of NICs or particular classes (e.g. 802.3, 802.11a, 802.11b, GPRS, GSM) of NICs. Furthermore, different security policies may be assigned based on the operating system employed or the version of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or antivirus software, or intrusion-detection software may be the basis for setting different policies on a particular port, network adapter or data.

As with the location detection module 208, the security features module 210 has a communication interface to the policy setting module 212 in this embodiment as well as the memory locations 216. An activity status indicator field for the feature stored in the memory locations 216 may indicate the activity status of active or inactive for a security feature. The policy setting module 212 may be notified of the active features via the communication interface implemented in the same manner described in any one of the examples discussed above with respect to the location detection module 208 or in any manner known to those of ordinary skill in the art.

The policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a wired connection, or the case in which 802.11i cryptography is being used over the wireless connection. Again, in an alternate embodiment the policy enforcement control module 244 may operate as part of a separate computer system that transfers commands over a network to the mobile device. In the illustrated embodiment of FIG. 2B, a client diagnostics module 246 processes events and performs audits relating to processing performed by one or more of the modules. The remote diagnostics module 246 transmits over a network 204 diagnostic information to the remote diagnostic module 224 on the server computer system. Examples of tasks that the diagnostics module 246 performs in order to obtain diagnostics information are as follows:

Verify that correct files are in correct locations.
Verify (e.g. checksum) all files to verify no corruption.
Verify time/date stamps for correct versions.
Check for outdated installation (INF, PNF) files.
Verify that all registry entries are correct and correct any errors found. For example, it is verified whether the indications of the installation of the network interface cards (NICs) is accurate.

Examples of other tasks that the client diagnostics module 246 may perform to provide diagnostic information to the remote diagnostics module 224 on the server computer system 200 include enabling and disabling advanced debugging and sending debugging output to the server computer system 200. For example, enabling and disabling advanced debugging includes turning on system event logging with options including which parameters to log, when to log, etc. and allowing a debug version of a system component to be installed. In this example, the system event log or portions of it and any special debug output files that debug components generate are sent to the remote diagnostics module 224 on the server.

Second Embodiment of Server And Mobile/Client Devices

Figure 3:
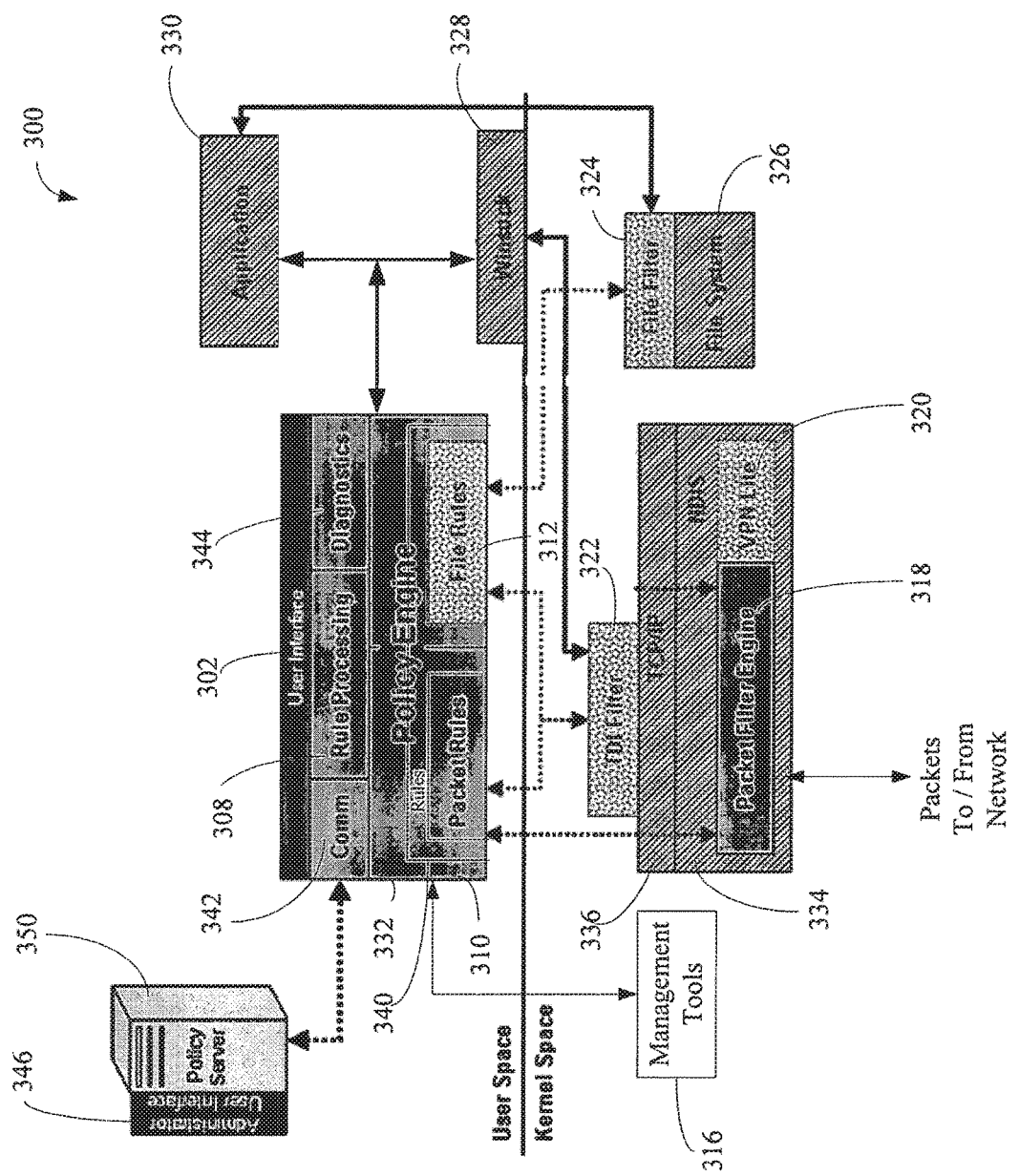
FIG. 3 illustrates a server system embodiment for administering the protection of data accessible by a mobile client device in accordance with second embodiment of the present invention.

FIG. 3 illustrates a system including a server and mobile client device for protection of data accessible by the mobile client device in accordance with second embodiment of the present invention. As illustrated, the system 300 comprises a policy server 350 having an administrator user interface 346. This system 350 is communicatively coupled over a network with the client side system through a communication port 342. Also, as is apparent to those of ordinary skill in the art, the policy server 350 may be implemented in one or more computers or computer systems. For example, it may comprise a management server executing on one machine for establishing communication sessions and a number of computers with which client devices may communicate in order to obtain their updates and receive diagnostic assistance.

The client side system embodiment comprises a policy engine 332 operating in application space having a communication interface to management tools 316 of the operating system, a communication interface to a file filter 324 operating in the kernel space that controls access to the file system 326, a communication interface to a user interface module 302, and also having a communication interface to a packet filter engine 318 operating within a driver 334. In this example, the driver 334 is an NDIS intermediate driver 334 operating within the kernel of the operating system of the mobile device.

The policy engine 332 further comprises a diagnostics module 344, a rule processing module 308, rules 340 and representative examples of rules subsets, packet rules 310 and file rules 312. In addition to the packet filter engine 318, the driver 334 further comprises an application filter 322, in this example, implemented as a transport driver interface (TDI) filter 322 and a VPN module 320 embodied here as a VPN Lite 320 implementation discussed below. The TDI filter 322 comprises a communication interface with the packet rules subset 310 and the file rules 312 subset in this example. It also communicates with the packet filter engine 318 as part of the driver 334. The TDI filter 322 further comprises a communication interface with a Windows Socket (Winsock) layer 328 in application space. The Winsock layer implemented in this example as a Windows socket filter and communicates with one or more applications 330 in application space.

In this embodiment, network environment location detection is performed by the policy engine 332, in accordance with rules implementing one or more location detection tests in the Rules set 340, based on network parameters obtained by the NDIS driver for OSI layers 2-5, and by the TDI filter 322 for OSI layers 6 and 7. For example, the Winsock 328 captures information about network applications starting and stopping and what ports the applications will be using. This information is provided to the filter 318 and the policy engine 332 to provide application awareness. Furthermore, the policy engine 332, in accordance with the current security policy, provides rules with respect to applications. For example, the engine 332 may provide a list of which applications can or cannot access the network, as well as the target IP addresses and ports that they are or not allowed to use. The policy engine 332 then enforces the current policy in accordance with these rules applicable to applications.

In this example, windows socket 328 is used to determine which application (e.g. browser e-mail application such as Outlook Exchange®) is accessing the network and what networking services the application will be using. An example of an application's network service usage could include Outlook Express opening a specific set of Winsock ports, each using a separate protocol and target I.P. address. The windows socket 328 will pass this information to the packet filter engine 318, which then informs the policy engine 332 using an event signaling mechanism. An example of an event signaling mechanism is to use named events to signal the policy engine 332 that some event has occurred.

Filtering of specific applications provides further resolution for location detection and enforcement mechanisms. The context of Microsoft® Networking provides an example of the benefits of such a filter. Several applications such as Exchange and Microsoft® File Sharing can and do use the same TCP and UDP ports. The NDIS filter driver 334 cannot determine which application is active based solely on TCP and UDP ports. The NDIS filter driver will act on the low level information i.e. TCP or UDP port numbers. When the packet arrives at the TDI layer 322, the TDI filter driver 322 determines based on one or more application parameters for which Microsoft Networking application a packet is destined and if the packet should be forwarded or filtered. For example, the TDI filter 322 provides to the driver, via IOCTL calls, "sessions" which provide information about applications opening ports for sending, listening (receiving), and details such as what protocol is being used and the target IP address of sent packets. Once the application closes the Winsock port, the TDI filter 322 can inform the packet driver that the session is now closed. These sessions allow the driver to be able to detect what incoming and outgoing packets should be allowed through the system and which packets should be forwarded or filtered.

A benefit of this embodiment is that it allows the NDIS filter driver 334 to do low level filtering based on port or protocol information and not have the overhead of application specific parsing. A modular approach to packet and application filtering is allowed.

The policy engine 332 also has a communication interface to management tools 316 of the operating system. The management tools 316 provide information to the policy engine 332 such as the types of adapters connected to the mobile device and specific information about each of them such as their brand name. The policy engine 332 also receives from the management tools 316 the local IP address associated with each adapter. Additionally management tools 316 alert the policy engine 332 that applications are running. For example, a process table maintained by the operating system may be monitored and notifications sent by the management tools 316 to the policy engine 332. For example, it may be determined whether 802.11i wired equivalency protection (WEP) software is running on a network adapter card through which wireless data is being sent and received. In this way, the policy engine 332 determines which security features are available in a system.

The policy engine 332 may create a security policy that is not inconsistent with the policies downloaded from the policy server 350. Additionally, modification and local management of policies as allowed, for example in accordance with permissions of policies set by the policy server 350. The policy engine 332 receives user input and sends output via a communication interface with the user interface module 302 to display and change policy settings responsive to user input.

Rules 340 comprise rules that define one or more security policies to be enforced by the policy engine 332. The policy engine 332 comprises a rule processing module 308 which executes tasks in accordance with determinations to be made as set by the rules for the current security policy and for directing the appropriate results dictated by the rules of the current policy.

In one embodiment, rules are pairings of logically grouped conditions with results. The following are examples of conditions, which may be connected by logical operators:
  Check for the existence of a registry key
  Check for a registry value
  Check for the existence of a file
  Check for a currently running application
  Check for a currently running service
  Check for the existence of network environment settings (includes a list of environments)
  Verify that specified applications are running
  Verify that specified protocols are enabled
  Verify that specified VPN is running
The following are examples of results:
  Can/Can't use the network
  Can/Can't use the machine
  Locked in to a certain location
  Can/Can't access the file
  Can/Can't use the application
  Only transfer encrypted version of file.

Examples of subsets of rules are illustrated in FIG. 3, packet rules 310 and file rules 312. These subsets illustrate examples of enforcement mechanisms that may work at different layers of a communication model, for example at the network layer and at the application layer.

One example of an enforcement mechanism is referred to as stateful filtering. In one example, a security policy is called a type of shield or is referred to as a particular type of shield level. The state may hereafter be referred to as the shield state or shield.

If the filtering is performed on a packet basis, it is referred to as stateful packet filtering. In stateful packet filtering, a packet filter such as the packet filter engine 318 as it name suggests filters packets based on a state set by the currently enforced policy with respect to a parameter. Examples of such a parameter include source IP addresses (for received packets) or target IP addresses (for sent packets), port numbers, port types or a port group. A port group is a list of ports that are used by a particular application, network service or function. For example, a port group can be created that includes all the ports for a particular instant messaging application, or for all supported instant messaging applications, or for all applications used internally at a company. Examples of port groups that may be selected for processing by a policy include web surfing ports, gaming ports, FTP and SMTP ports, file sharing and network ports, and anti-virus updates and administration ports. A port group can contain individual port items or other port groups.

In this example, we discuss a version of stateful filtering called adaptive port blocking. In this example, there are rules comprising a mapping between a set of ports, port types, and actions. The ports are the actual port numbers, the port types enumerate the possible port types e.g. UDP, TCP, IP, or Ethertype, and the actions are what is to be done with this particular port e.g. filter, forward, or inform. The inform action will post an event to the policy engine 332 when a packet is sent or received on the specified port. Filter and forward action control the sending and receiving of packets on the specified port.

In one example, a policy is in effect that each port is in one of three modes: open, closed, or stateful. When the port is open, all traffic (both incoming and outgoing) on that port is permitted to flow through the packet filter. When the port is closed, all traffic on that port is blocked (both incoming and outgoing). When the port is stateful, all outgoing traffic on that port is permitted to flow through the packet filter, and incoming-responses to that outgoing traffic are allowed back through, but unsolicited incoming traffic is blocked. In another example, incoming and outgoing traffic may be blocked on a basis, examples of which are a network service or an application.

In the system embodiment illustrated in FIG. 3, components such as the policy engine 332, the packet filter engine 318 and the TDI filter 322 may be employed for supporting stateful filtering. In one example, a session is created when a mobile device initiates communications with a particular remote or a specified set of remote computing devices. The stateful filtering, as may be performed by the packet filter engine 318 and/or the TDI filter 322 in accordance with rules 340, for example rules in the subset of the packet rules 310, applicable to the current policy, may use the transport protocol to determine when a session is starting and the address of the remote device. Forward and filter decisions in accordance with rules in the set of rules 340 or the subset of the packet rules 310 may be based upon the session information obtained at session startup. Additionally, forward and filter decisions may be based on application parameters received via the TDI filter 322. This provides the benefit of more refined application filtering as illustrated in the example discussed above.

The policy engine will pass the rules to the packet filter engine as commands using the existing IOCTL interface. In one example, the policy engine determines based upon its current rules which ports or range of ports should do stateful filtering. These rules are then passed to the packet filter engine 318 by an IOCTL command. In another example, the policy engine 332 determines that rules of the current security policy do not support certain applications accessing a network. These rules are passed to the packet filter engine 318 as well as the TDI filter 322 for application specific filtering. The policy engine 332 may also pass rules about application-specific network access to the TDI filter 322 via an IOCTL interface.

Each component of the system may also provide health checks on the others. For example, the policy engine 332, the file filter 324, and the packet filter engine 318 report whether any of the other services have been disabled or removed from the system to the diagnostics module 344. This information may be relayed to the policy server 350 as it indicates a possible compromise of the protective system. The policy server 350 in that case provides diagnostic support information to the diagnostics module 344.

Stateful packet filtering deals with packets with different types of address. Outgoing packets have three different types of addresses: directed, multicast, or broadcast. Directed addresses are specific devices. Broadcast packets are typically used to obtain network configuration information whereas multicast packets are used for group applications such as NetMeeting®.

To establish session state information with a directed address is straightforward. The IP address and the port number are recorded in a session control block. When the remote responds the receive side of the filter engine will forward the packet because a session control block will exist for that particular session.

When the outgoing packet is a multicast packet there is a problem. Multicast packets are sent to a group; however, a multicast address is not used as a source address. Hence any replies to the outgoing multicast will have directed addresses in the source IP address. In this case the filter engine will examine the port to determine a response to a given multicast packet. When a response to the specified port is found session control block will be completed i.e. the source address of this incoming packet will be used as the remote address for this particular session. However, more than one remote may respond to a given multicast packet, which will require a session control block be created for that particular remote. The broadcast packets may be handled in the same manner as the multicast.

The file rules subset 312 have a communications interface such as an IOCTL interface with a file filter 324 having a communication control interface with a file system 326. The file filter 324 may implement one or more filter related enforcement mechanisms. A policy may protect files based on the location in which they are created and/or modified as well as the location in which the mobile device is operating. The policy specifies a set of locations in which the files are to be made available, and whenever the mobile device is not operating in one of those locations, those files are unavailable. In another embodiment, policies may require that files be encrypted only if they were copied from certain network drives.

One reason for requiring that all files created and/or modified in one of the specified locations is so that copies of sensitive files or data derived from the sensitive files are also protected. Specific mechanisms for protecting the files include file hiding and file encryption.

When the mobile device is operating in one of the specified locations, the files can be located (e.g., they are not hidden). When the mobile device is operating in some other location, the files are hidden. One purpose of this mechanism is to prevent the user from accidentally revealing the contents of sensitive files while in locations where access to those files is not authorized.

One mechanism for hiding the files is to simply mark them "hidden" in their Windows properties pages, and to cache the access control list (ACL) on the file and then modify the permissions to deny all access by non-administrators. Other versions may use the file-system filter to more effectively render the files unavailable.

In one embodiment, files that are subject to location-based protection by the policy are always stored encrypted. When the mobile device is associated with one of the specified locations, the files can be decrypted. When the mobile device is associated with some other location, the files cannot be decrypted. This mechanism provides a benefit of preventing unauthorized persons who may have stolen the device from gaining access to sensitive files.

One mechanism for encrypting the files is to simply mark them "encrypted" in their properties pages, and to rely on the file hiding feature (see above) to stop the files from being decrypted in an unauthorized location. Other versions may use the file-system filter to more effectively encrypt the files in a way that does not depend on the operating system to prevent them from being decrypted in an unauthorized location.

Policies can have rules controlling the use of VPNs. For example, a rule can require that when the VPN is in use, all other ports are closed. This prevents hackers near the user from co-opting the user's device and coming in to the corporate network over the user's VPN connection. In one embodiment, a lightweight web-based VPN is used that allows traffic from selected applications (e.g., email) to be encrypted with Transport Layer Security (TLS).

In one embodiment, a VPN Lite 320 having a communication interface with the packet filter engine 318 establishes a TLS-encrypted, authenticated connection with the server, and then sends and receives traffic over this connection. The TDI filter 322 diverts the outgoing traffic from the application to a VPN client piece 320, and incoming traffic from the VPN client piece 320 to the application.

In one implementation example in accordance with the present invention a layer is inserted into the Winsock environment, which opens up a Transport Layer Security (TLS) or Secure Socket Layer (SSL) socket to the VPN server, and tunnels all application network traffic through that connection to the VPN server. The applications are unaware that the VPN is active. The VPN has a very small footprint, since TLS is included in Windows®. In this example, using the Winsock Environment, all communication between client and server is routed through a secure channel. Unlike current clientless VPNs, all existing applications are supported As seen in the embodiment of FIG. 3, the packet filter engine 318 and the TDI filter 322 comprise implementation examples of functionality for processing network traffic. The policy engine 332 performs implementation examples of functions of determining location analogous to those of the location detection module 208, of determining policies analogous to those of the policy setting module 212 and of identifying active security features analogous to those of the security features determination module 210. Furthermore, the packet filter engine 318, and the TDI filter 322 also perform implementation examples of enforcement mechanisms that the policy enforcement control module 214 may analogously perform.

The diagnostics module 344 of the policy engine 332 performs similar functions discussed with respect to the client diagnostics module 246 of FIG. 2B. For example, it provides status, configuration, error logs, audit logs, and debug information to the server system. Similarly, it would assist a server side remote diagnostics module such as module 224 in FIG. 2A in debugging an error, for example in a method such as that described in FIG. 11.

In one embodiment, policy documents are XML documents. XML allows great flexibility in design, usage, and enhancement of policies. Using the flexibility of XML as the means to distribute enterprise wide policies simplifies the complex problem of distributing and enforcing enterprise wide policies. Policies are defined by the enterprise including but not limited to program usage, network access, hardware restrictions, VPN access, data access, and many other policies. The definition of these polices is performed at the enterprise level using XML Schemas and documents. The policies may then be distributed to the enterprise clients via various forms of data transfer. Furthermore, the policies may also be protected from hacking by encryption or signatures (i.e. XKMS, XMLDSIG, XMLENC, or proprietary encryptions). The policy is then enforced on the client by a process that can interpret the policy distributed by the enterprise. This approach allows a policy to be extensible and easily changed by the administrator. Furthermore, policy management, compilation and interpretation are performed by policy aware application interfaces. Also, the administrator can configure elements of the policy such that they are configurable by the end user. In one example, the XML schema or XSD is derived from the standard XML schema http://www.w3.org/2001/XMLSchema (May 2001). In this example, a schema defines one set of types that is used by both the server (group) and the client policies. Policies may be signed to ensure integrity. Additionally individual policy elements will be signed to ensure integrity of policy enforcement.

In one embodiment, a very thin client host application resides on a client mobile device. For example, it may be part of the policy setting module 212 for the embodiment of FIG. 2B or part of the policy engine 332 in FIG. 3. The central policy server or server system 350 pushes execution instructions to the client, described by XML. As a result, a small relatively stable execution environment is available as part of the client device. When additional or different functionality is needed on the client, this new functionality is pushed to the client in an XML format.

For example, assume version vX.01 of a product supports two types of security policies. For version X.02 it is necessary to implement a third type of security policy. The implementation and associated behaviors of the policy would be described within XML and published to the clients via the policy server. Clients running vX.01 would then effectively be upgraded without user intervention. In another example, this approach could be used for instantiating portions of an application to clients in a cafeteria style—e.g. they want feature 1, 2, 3, 6, 8 and not 4, 5, 7. If the client requires a change to their implementation, they change their menu selections and implementation and behaviors are pushed to their respective client instances.

Access Point Filter and Lock Units

Figure 4:
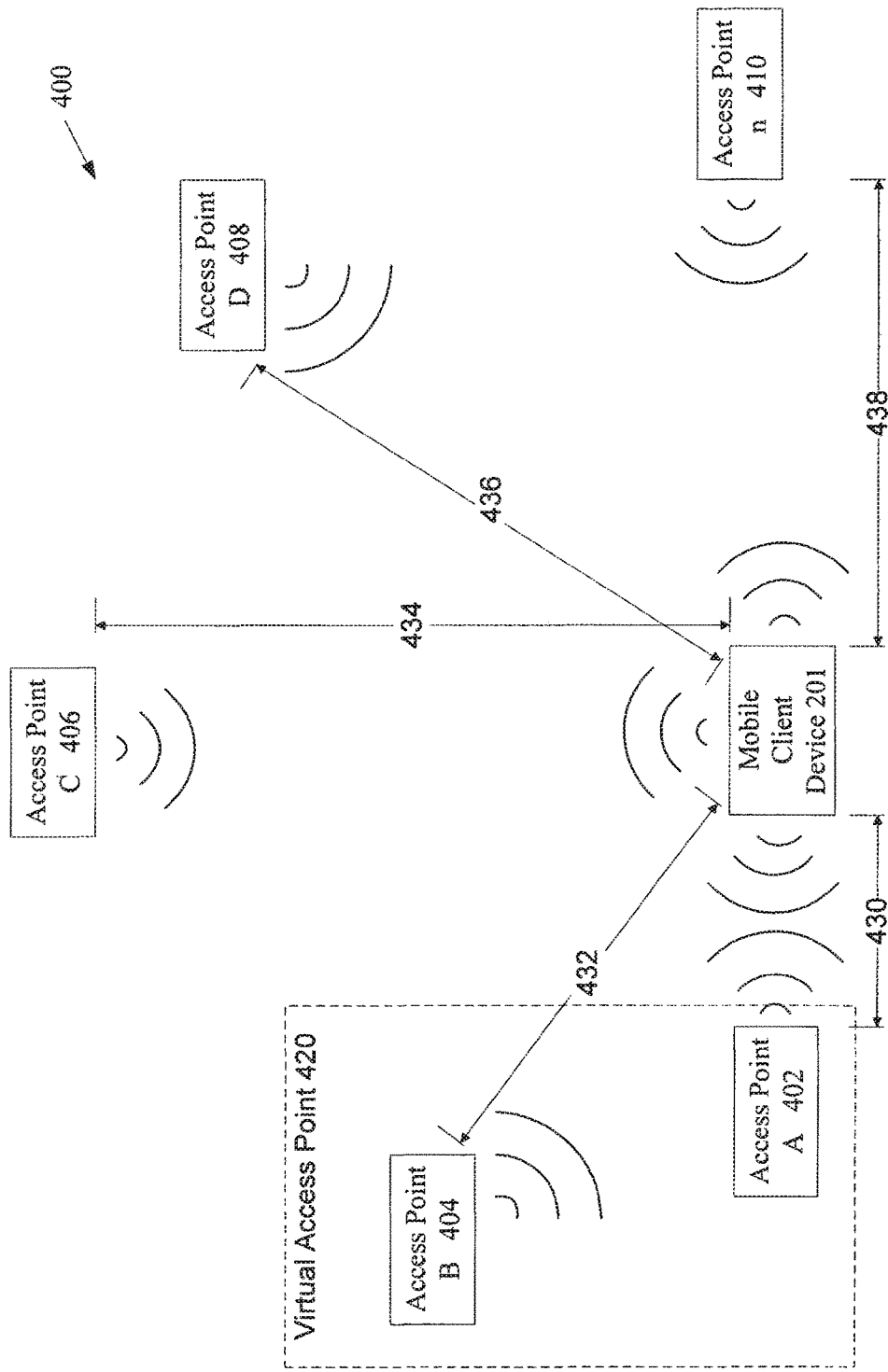
FIG. 4 illustrates an example of a mobile computing device being accessible to a plurality of access points and communicating in accordance with the present invention.

Referring now to FIG. 4, an example of a mobile client device 201 being accessible to a plurality of access points 402-410 and communicating in accordance with the present invention is shown. FIG. 4 is only an exemplary environment for describing the features and function of the present invention, and the mobile client device 201 may be in range of any number of access points 402-410. As shown in FIG. 4, each of the access points 402-410 is a different distance 430-438 from the mobile client device 201 and may also have different obstacles or disturbances in the communication to the mobile client device 201, and therefore each may provide a different signal strength for communication.

One key aspect of the present invention is the ability to control which access points 402-410 are presented to the user of a mobile client device 201, and with which the mobile client device 201 can communicate. The visible and accessible access points 402-410 are preferably set by the policy server 350 in FIG. 3 which sends a list of access points with which the mobile client device 201 can present to the user and establish communication. The policy server 350 preferably provides a different list suitable for each location.

For example, a security policy for the location shown in FIG. 4 may be provided from the policy server 350 (not shown in FIG. 4) to the mobile client device 201. Such a security policy may provide that communication is only permitted under the security policy with access points A 402, B 404 and C 406. When the user tries to connect to the mobile client device 201 to available access points at the location shown in FIG. 4, only access points A 402, B 404 and C 406 are presented to the user as possible connection points, and only connection to those points will be allowed by the security policy enforcement control module 214 in FIG. 2B. Even though access points D 408 and n 410 are accessible to the client mobile device 201, they will not be presented to the user as a possible connection, and connection to them will not be permitted.

Another key aspect of the present invention is the ability to lock the mobile client device 201 to communicate with a specific access point. The present invention advantageously overrides the default switching protocol of the wireless communication adapter such that the mobile client device 201 continues to communicate with a specific access point even though another access point may provide a signal with greater strength so long as the signal strength for the specified access point is above a predefined minimum strength threshold. The specific access point to which the mobile client device 201 is locked is determined using a variety of factors as will be described in more detail below with reference to FIGS. 9A and 9B. This is particularly advantageous because it prevents the loss of connection between the mobile client device 201 and the specific access point, and having to establish a connection to a new access point.

For example in FIG. 4, the mobile client device 201 may be locked to access point C 406. Even though the signal strength of access points A 402, B 404, D 408 and n 410 may be greater than that of access point C 406, the mobile client device 201 will continue to communicate with access point C 406 until the signal strength is below a predetermined minimum. The security policy enforcement control module 214 locks to access point C 406 by masking the appearance of competing access points A 402, B 404, D 408 and n 410 from the list that the mobile client device 201 can detect. This allows the mobile client device 201 to remain connected to access point C 406, the access point of interest, regardless of signal fluctuations until the signal becomes totally unusable.

Yet another aspect of the present invention is that a plurality or group of access points may be set to be a virtual access point such that plurality of access points are presented to the user as a single access point. The virtual access point interacts with the mobile client device 201 in the same way a single access point would interact with the mobile client device 201, and the user may not be aware and need not care that communication is actually roaming between any one of multiple access points in the set of access points that forms the virtual access point. Moreover, the visibility and lock features described above are applicable to the virtual access point and the security policy enforcement control module 214 treats it as a single access point such that a virtual access point is visible or not, and the access points it represents are never presented, and switching between access points forming a virtual access point does not affect the user. This feature is particularly advantageous for managing multiple access points and making them appear the user the same as a location definition.

For example, as shown in FIG. 4, access point A 402 and access point B 404 may be combined into a virtual access point 420 for communication with the mobile client device 201. As such virtual access point 420 will be visible to the user only if 1) the virtual access point 420 is defined under the security policy to be visible and accessible, or 2) both access point A 402 and access point B 404 are defined under the security policy to be visible and accessible. Similarly, the mobile client device 201 can be locked to communicate with the virtual access point 420 and will continue to communicate with the virtual access point 420 until the signal strength is below a predetermined minimum. In other words, the signal strength between the mobile client device 201 and both access point A 402 and access point B 404 must be unusable, otherwise the mobile client device 201 could maintain communication with either access point A 402 or access point B 404. While FIG. 4 only shows the virtual access point 420 as comprising two other access points 402, 404, those skilled in the art will recognize that a virtual access point 420 may include any number of other access points and that two virtual access points may include overlapping sets of access points.

Figure 5:
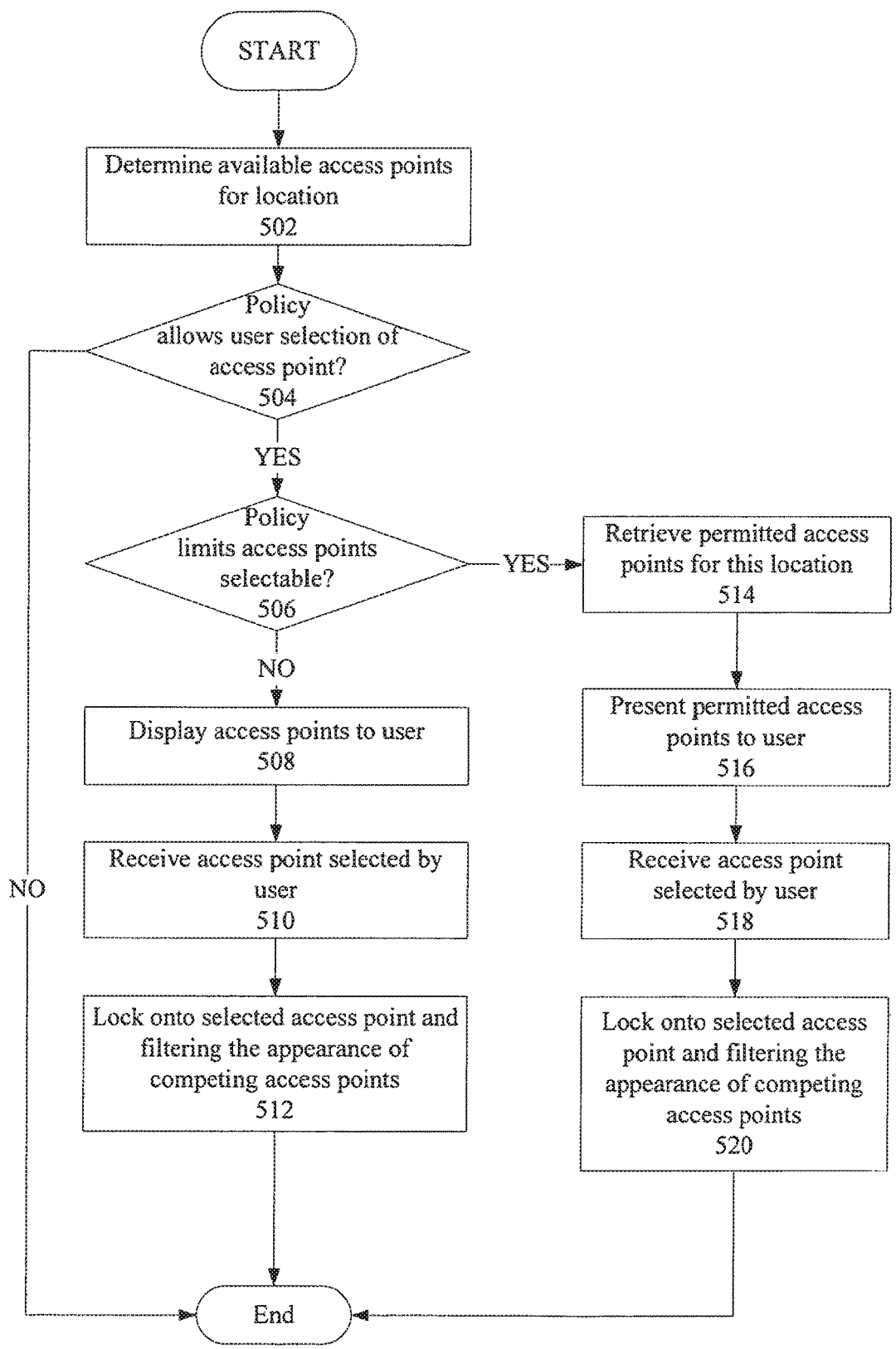
FIG. 5 is a flowchart illustrating a method for locking communication between a mobile client device and a user selected access point.

Referring now to FIG. 5, the method for locking communication between a mobile client device 201 and a user selected access point will be described. The method begins by determining 502 the available access points for the location that the mobile client device 201 is operating. Then the method determines 540 if the security policy enforced at the mobile client device 201 for the current location allows user selection of access points. If not, this method is complete and ends because under such a security policy the user is not permitted to connect to access points. Such a security to policy prevents users from connecting to unsecured networks such as when the location is a publicly available hot spots.

However, if the security policy does allow user selection of access points for this location, the method continues in step 506, where the method determines whether the security policy limits the access points that are selectable. If not, the method continues by displaying 508 all the accessible access points to the user. The user uses an input device to select an access point, and the access point selected by user is received 510. Then the mobile client device 201 locks 512 into communication with the access point and filters the presence and appearance of competing access points to the user. As has been described above, the mobile client device 201 will remain locked in communication with the selected access point until provides a signal that is below a predetermined threshold of acceptability. In one embodiment, that predetermined threshold is a signal that has an unusable strength. It should be understood that the predetermined threshold of acceptability could also be signal strength of a preset level or other factor relating to the signal such as protocol, encryption, etc.

If in step 506 it is determined that the security policy limits the access points that are selectable, then the method continues in step 514. In step 514, the mobile client device 201 retrieves 514 permitted access points for this location. This is preferably done by policy enforcement control module 214 accessing memory location 216 storing permitted access points for the location. Then the mobile client device 201 displays or presents 516 the permitted access points to user. An access point selected by user is received 518 by the mobile client device 201. It should be understood that if there is only a single access point permitted for this location, steps 516 and 518 are omitted, and the method proceeds directly to step 520. In this case, the access point is set by the security policy and pushed from the policy server 350 to the mobile client device 201 and the user does not select the access point. Finally, the mobile client device 201 locks 520 onto selected access point and filters the appearance of competing access points. This step is similar to that described above as step 512 but limited to the permissible access points, and the method is complete.

Figure 6:
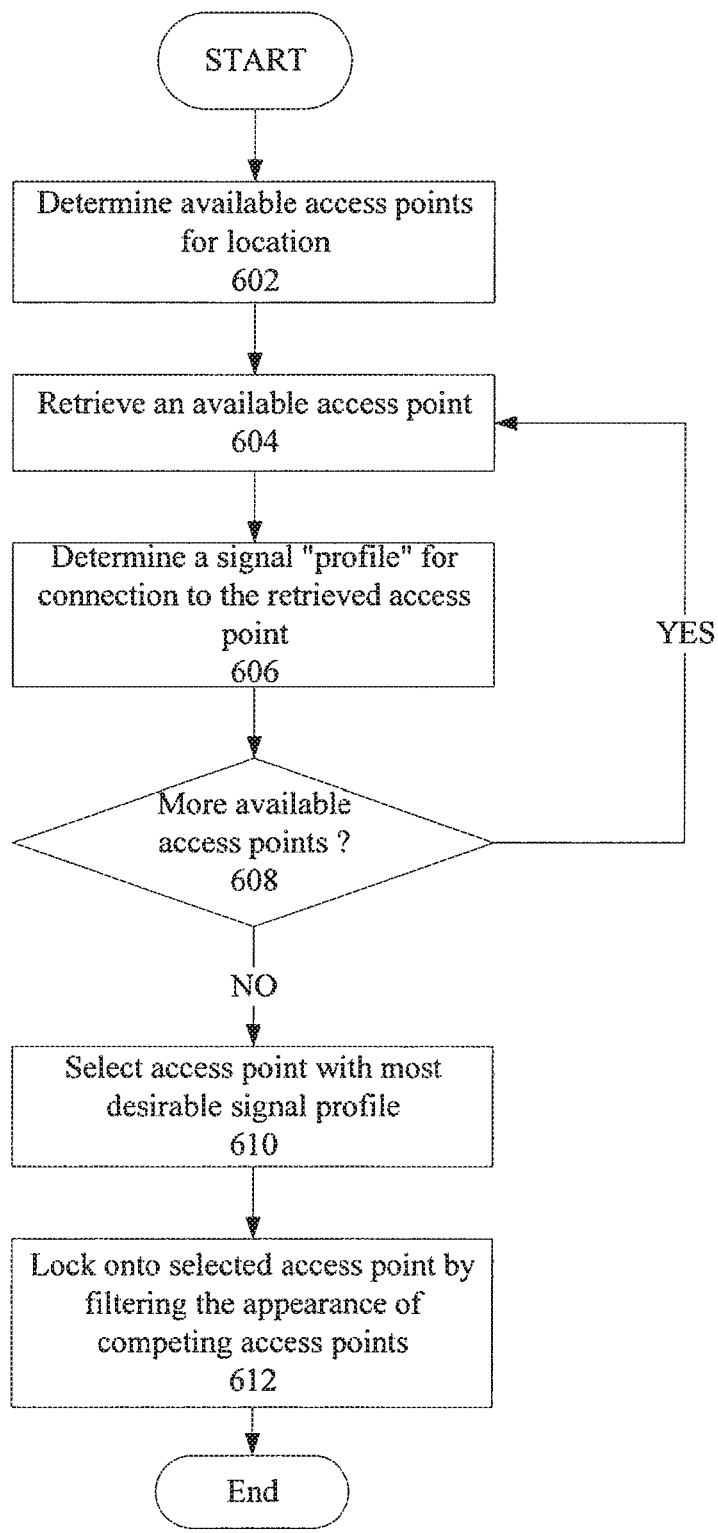
FIG. 6 is a flowchart illustrating a method for locking communication between a mobile client device and an access point having the best signal profile.

Referring now to FIG. 6, the method for locking communication between the mobile client device 201 and an access point having the best signal profile is described. The method begins by determining 602 available access points for the location of the mobile client device 201. Then the method retrieves 604 an available access point from the group determined in step 602. If there are no available access points the method ends. If there is at least one available access point, the method continues to determine 606 a signal "profile" for connection to the retrieved access point. The signal "profile" is preferably data about the connection between the mobile client device 201 and the access point that is used to determine the quality of the connection. The signal profile preferably includes one or more from the group of signal strength, communication protocol, encryption type, encryption key length, service set identifier (SSID), media access control (MAC) address, authentication type, authentication method, and other information. Once the signal profile for the retrieved access point is determined, the method tests 608 whether there are more available access points that were found to be available for the location in step 602. If so, the method returns to step 604 and repeats steps 604 and 606 for each available access point. If not, the method continues by selecting 610 the access point with the most desirable signal profile. In one embodiment, any access point that has a signal profile criterion that matches a preset requirement may be in the group of desirable access points. In another embodiment, defining multiple criteria the signal must meet sets desirability. For example, each of the factors included in the signal profile could be weighted for desirability such that the most desirable signal profile was one that had encryption, with the key length of 64 or greater, and the greatest signal strength. Those skilled in the art will recognize a variety of rules that could be applied to the signal profiles to determine which signals are the best or most desirable for a give location. In addition, the security policy can provide a default access point in the event there is not a signal profile that is most desirable. Once the most desirable signal profile and its corresponding access point are selected 610, the method locks 612 onto selected access point by filtering the appearance of competing access points in a similar manner to that described above with reference to steps 512 and 520.

Figure 7:
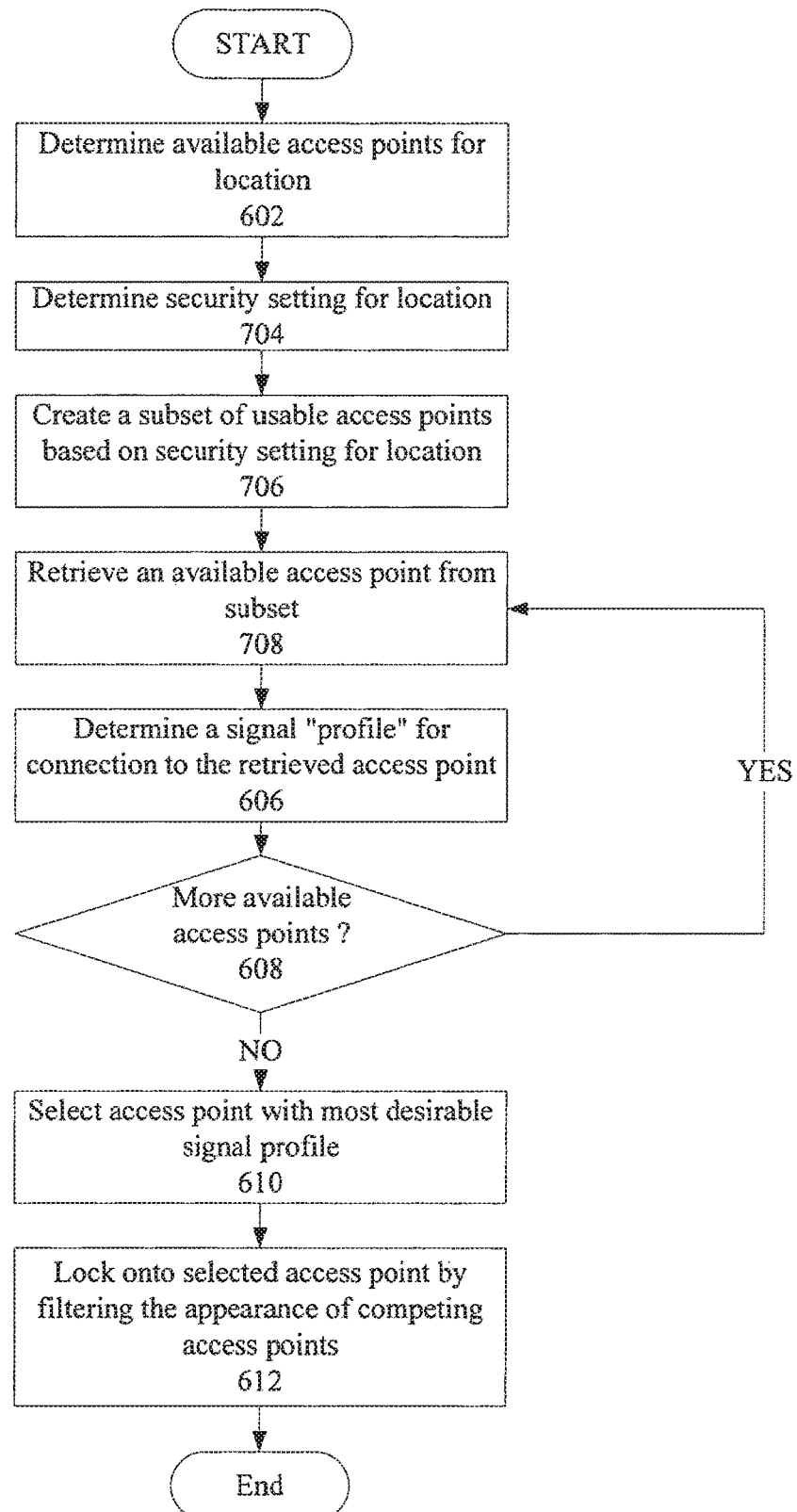
FIG. 7 is a flowchart illustrating a method for locking communication between a mobile client device and an access point authorized by the security policy and having the best signal profile.

FIG. 7 shows a method for locking communication between a mobile client device and an access point authorized by the security policy and having the best signal profile. This method is a combination of the methods described above in FIGS. 5 and 6, so where appropriate like reference numerals have been used for ease understanding and convenience. The method begins by determining 602 available access points for the location of the mobile client device 201. Then the method determines 704 the security setting for the location of the mobile client device 201. Next, the method creates 706 a subset of usable access points based on the security setting for the location of the mobile client device 201. This is preferably done by starting with a list of available access points from step 602 and selecting those access points that are acceptable under the security policy for this location from the list of available access points. Then in step 708, the method retrieves 604 an available access point from the subset created in step 706. Again, if there are no access points in the subset the method is complete and ends. However, if there is an access point in the subset, the method determines 606 a signal profile for connection to the retrieved access point in step 606 and then completes step 608, 610 and 612 as has been described above with reference to FIG. 6. If in step 608 there are more available access points from the subset, the method returns to step 708 to repeat steps 708 and 606 for each access point. Those skilled in the art will recognize that this method has the advantage of allowing enforcement of a security policy while preserving some flexibility to select the access point with the best signal profile.

Figure 8:
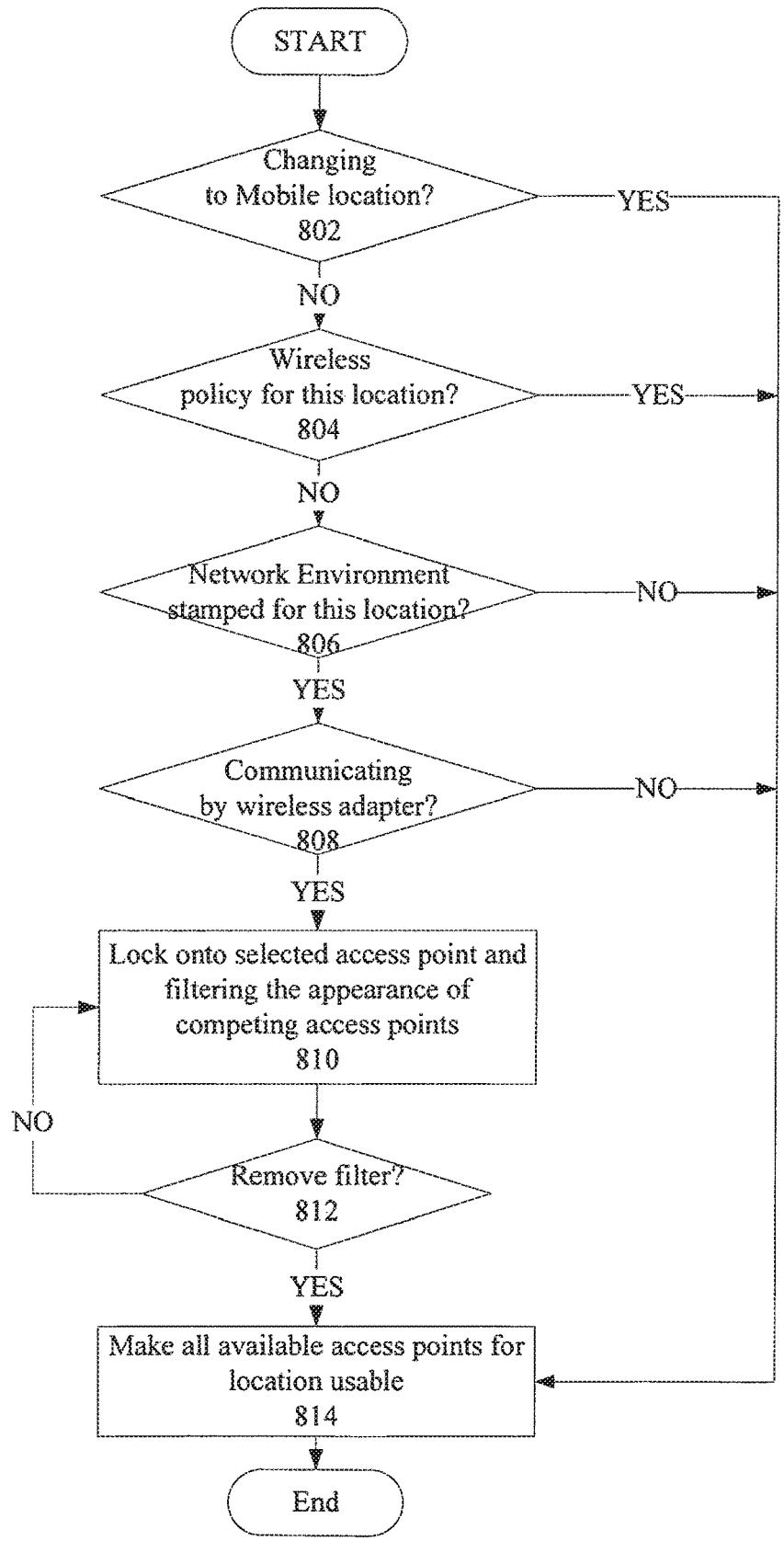
FIG. 8 is a flowchart illustrating a method for removing a filter of access points accessible by a mobile client device.

FIG. 8 is a flowchart of a method for removing the filter of access points accessible by the mobile client device 201. Once the mobile client device 201 has activated the filter such that only a given access point or a small set of access points are visible and usable, a method to remove the filter and allow all access points accessible by the mobile client device 201 for a location to be presented to the user is needed. The method of FIG. 8 illustrates one embodiment for that process. The method begins with a series of tests. First, the method tests 802 whether the mobile client device 201 is transitioning from a secure location to a mobile location. If so, the method proceeds to step 814 where all the available access points for the location are made usable. If not, the method determines 804 whether there is a wireless policy for the location of the mobile client device 201. If so, the wireless policy controls which access points that are usable, and the method proceeds to step 814 where all the available access points for the location are made usable consistent with the wireless policy for this location. Next, the method tests 806 whether the network environment for the location has been stamped. If not, the method continues in step 814 where all the available access points for the location are made usable. If the method the network environment for the location has been stamped, the method tests 808 whether the mobile client device 201 is communicating via a wireless adapter. If not, it is assumed it is a wired connection and the method continues to step 814 to make usable all the available access points for the location. However, if the mobile client device 201 is communicating via a wireless adapter, the method locks 810 into communication with the access point and filters the presence and appearance of competing access points to the user. Next, the method tests 812 whether the filter should be removed. The filter should be removed in various circumstances such as 1) if the user manually requests a clear network environment operation; 2) if a location change for the mobile client device 201 moves to the mobile location; or 3) if the user manually performs a change location operation. If filter should not be removed, the method loops through steps 810 and 812 on a periodic basis. If the filter should be removed, the method proceeds to step 814 to remove the filter and make all available access points for the location usable.

Figure 9A:
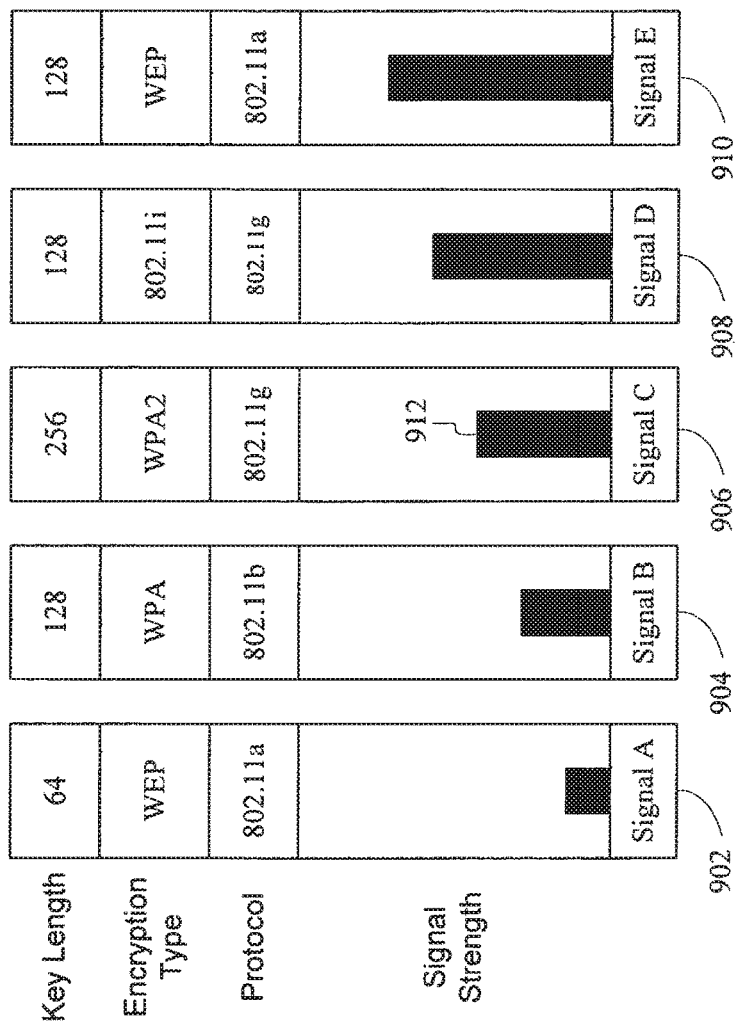
FIGS. 9A and 9B are exemplary signal profiles for a plurality of access points at different points in time.
Figure 9B:
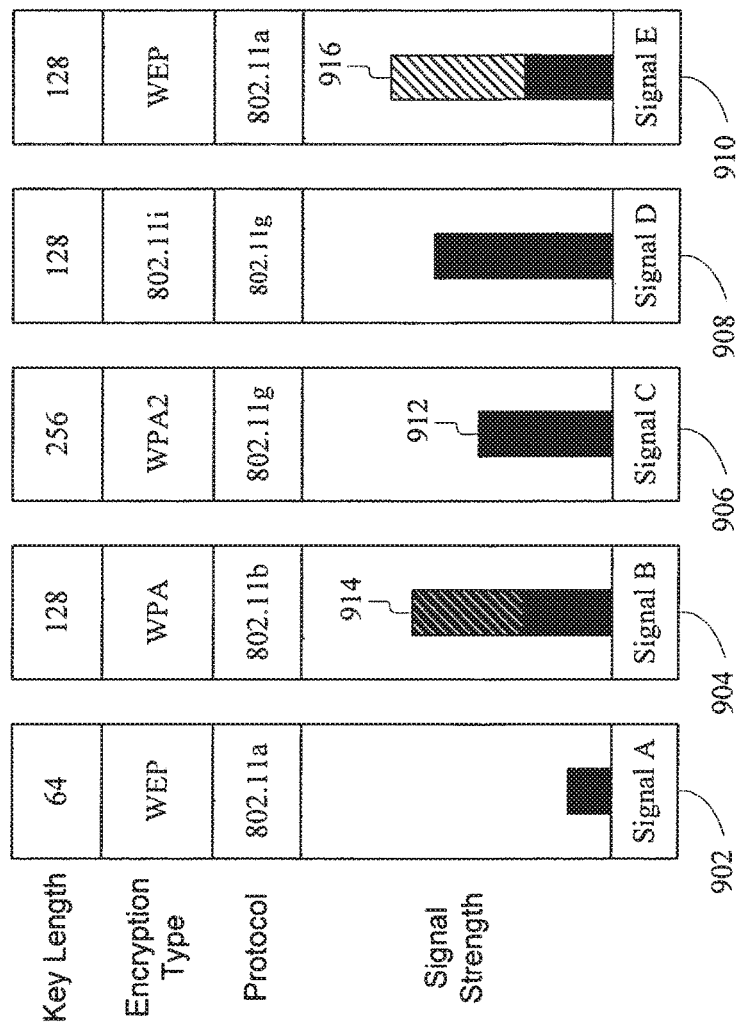

FIGS. 9A and 9B show exemplary signal profiles for a plurality of access points at different points in time. FIG. 9A shows signals profiles 902-910 for a plurality of access points a first time (t1). As can be seen, signals A-E have different signal strengths, protocols, encryption types, and key lengths. These signal profiles are provided just by way of example and the signal profile may include any of the information about the communication link provided by an access point. As an example, signal C may have the best signal profile because of a combination of signal strength, protocol and encryption type are the most desirable. This is completely dependent on rules set forth by the security policy. As such, the present invention would lock onto signal C and remain connected to the access point providing signal profile 906. This may be the case even though the signal strength for signal E is greater than the signal strength 912 for signal C. Even at a later time (t2) as shown in FIG. 9B, the mobile client device 201 would continue to communicate with the access point providing signal profile 906. The mobile client device 201 is locked into communication with the access point providing Signal C, and is unaffected by signal strength amplitude changes such as the signal strength of signal E being reduced 916 or the signal strength of signal B increasing 914. Thus, the present invention avoids the switching and bounce effects of the prior art that switches to the signal with the greatest signal strength.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. For example, one embodiment of the present invention is applicable to AdHoc peer-to-peer connections as well. Access using such connections could be allowed based on key length. Accordingly, the disclosure of the present invention is intended to be illustrative, but not limiting, of the scope of the present invention, which is set forth in the following claims.

The invention claimed is:

1. A method for providing security at a mobile device, comprising:
   providing, at the mobile device, a first security, the first security policy comprising a first location criteria;
   providing, at the mobile device, a second security policy, the second security policy comprising a second location criteria;
   detecting, by the mobile device, a location of the mobile device;
   determining, by the mobile device, that the detected location complies with one of the first location criteria or the second location criteria;
   in response to determining that the detected location of the mobile device complies with the first location criteria, applying, by the mobile device, the first security policy to the mobile device; and
   in response to determining that the detected location of the mobile device complies with the second location criteria, applying, by the mobile device, the second security policy to the mobile device;
   continuously monitoring, by the mobile device, the location of the mobile device; and
   in response to detecting that the location of the mobile device changed, automatically applying, by the mobile device, an appropriate security policy based on the changed location of the mobile device,
   wherein each security policy comprises rules as to what applications can be accessed on the mobile device.

2. The method of claim 1, wherein the first location criteria includes one selected from the group of a home, a work, an alternate, or a mobile location.

3. The method of claim 1, wherein the first and second security policies are stored on a memory of the mobile device.

4. The method of claim 1, wherein the first security policy comprises a first security feature and the second security policy comprises a second security feature; and applying the first security policy comprises applying the first security feature to the mobile device and applying the second security policy comprises applying the second security feature to the mobile device.

5. The method of claim 1, further comprising:
   providing, at the mobile device, a third security policy, the third security policy comprising a third location criteria; and
   in response to detecting that the location of the mobile device complies with the third location criteria, applying, by the mobile device, the third security policy to the mobile device.

6. The method of claim 1, wherein the first and second security policies are accessed over a network connection.

7. The method of claim 1, wherein the location of the mobile device is detected based on one or more parameters received from a network connection.

8. The method of claim 7, wherein the network connection is a wireless network connection.

9. The method of claim 5, wherein the third security policy comprises a third security feature and applying the third security policy comprises applying the third security feature to the mobile device.

10. The method of claim 1, further comprising:
    in response to determining that the detected location of the mobile device complies with the first location criteria, denying access to a first file stored on the mobile device; and
    in response to determining that the detected location of the mobile device complies with the second location criteria, allowing access to the first file stored on the mobile device.

11. The method of claim 1, wherein the detected location complies with the first location criteria or the second location criteria based on a criterion other than one or more security features of a network to which the mobile device is connected.

12. The method of claim 1, further comprising:
    in response to determining that the detected location of the mobile device complies with the first location criteria, allowing a first operation for accessing content on the mobile device; and
    in response to determining that the detected location of the mobile device complies with the second location criteria, denying the first operation for accessing content on the mobile device.

13. A mobile device comprising:
    a memory; and
    a processor configured to:
    receive, by the mobile device, a first security policy to the mobile device, the first security policy comprising a first location criteria;
    receive, by the mobile device, a second security policy to the mobile device, the second security policy comprising a second location criteria;
    detect, by the mobile device, a location of the mobile device;
    determine, by the mobile device, that the detected location complies with one of the first location criteria or the second location criteria;
    in response to determining that the detected location of the mobile device complies with the first location criteria, apply, by the mobile device, the first security policy to the mobile device; and
    in response to determining that the detected location of the mobile device complies with the second location criteria, apply, by the mobile device, the second security policy to the mobile device; and
    continuously monitor, by the mobile device, the location of the mobile device; and
    in response to detecting that the location of the mobile device changed, automatically apply, by the mobile device, an appropriate security policy based on the changed location of the mobile device,
    wherein each security policy comprises rules as to what applications can be accessed on the mobile device.

14. The mobile device of claim 13, wherein the first location criteria includes one selected from the group of a home, a work, an alternate, or a mobile location.

15. The mobile device of claim 13, wherein the first and second security policies are stored on the memory of the mobile device.

16. The mobile device of claim 13, wherein the first security policy comprises a first security feature and the second security policy comprises a second security feature; and applying the first security policy comprises applying the first security feature to the mobile device and applying the second security policy comprises applying the second security feature to the mobile device.

17. The mobile device of claim 13, the processor further configured to:
    receive, at the mobile device, a third security policy, the third security policy comprising a third location criteria; and in response to detecting that the location of the mobile device complies with the third location criteria, apply, by the mobile device, the third security policy to the mobile device.

18. The mobile device of claim 13, wherein the first and second security policies are accessed over a network connection.

19. The mobile device of claim 13, wherein the location of the mobile device is detected based on one or more parameters received from a network connection.

20. The mobile device of claim 19, wherein the network connection is a wireless network connection.

21. The mobile device of claim 17, wherein the third security policy comprises a third security feature and applying the third security policy comprises applying the third security feature to the mobile device.

22. The mobile device of claim 13, wherein the processor is further configured to:
  in response to determining that the detected location of the mobile device complies with the first location criteria, deny access to a first file stored on the mobile device; and
  in response to determining that the detected location of the mobile device complies with the second location criteria, allow access to the first file stored on the mobile device.

23. The mobile device of claim 13, wherein the detected location complies with the first location criteria or the second location criteria based on a criterion other than one or more security features of a network to which the mobile device is connected.

24. The mobile device of claim 13, wherein the processor is further configured to:
  in response to determining that the detected location of the mobile device complies with the first location criteria, allow a first operation for accessing content on the mobile device; and
  in response to determining that the detected location of the mobile device complies with the second location criteria, deny the first operation for accessing content on the mobile device.

25. A non-transitory computer-readable storage medium including instructions, which when executed by one or more processors of a mobile device, cause the mobile device to perform:
  providing, at the mobile device, a first security policy, the first security policy comprising a first location criteria;
  providing, at the mobile device, a second security policy, the second security policy comprising a second location criteria;
  detecting, by the mobile device, a location of the mobile device;
  determining, by the mobile device, that the detected location complies with one of the first location criteria or the second location criteria;
  in response to determining that the detected location of the mobile device complies with the first location criteria, applying, by the mobile device, the first security policy to the mobile device; and
  in response to determining that the detected location of the mobile device complies with the second location criteria, applying, by the mobile device, the second security policy to the mobile device;
  continuously monitoring, by the mobile device, the location of the mobile device; and
  in response to detecting that the location of the mobile device changed, automatically applying, by the mobile device, an appropriate security policy based on the changed location of the mobile device,
  wherein each security policy comprises rules as to what applications can be accessed on the mobile device.

* * * * *

UNITED STATES PATENT AND TRADEMARK OFFICE
CERTIFICATE OF CORRECTION

PATENT NO. : 10,652,745 B2
APPLICATION NO. : 14/991848
DATED : May 12, 2020
INVENTOR(S) : Brent Beachem et al.

Page 1 of 1

It is certified that error appears in the above-identified patent and that said Letters Patent is hereby corrected as shown below:

On the Title Page

Page 2: Column 1, Item (63):
Related U.S. Application Data, Line 2, delete "which" and insert -- and --.
Related U.S. Application Data, Line 5, delete "which" and insert -- and --.

In the Claims

Column 25, Line 4, in Claim 1, delete "security," and insert -- security policy, --.

Signed and Sealed this
Seventh Day of July, 2020

Andrei Iancu
*Director of the United States Patent and Trademark Office*